(12) United States Patent
Gillot et al.

(10) Patent No.: US 8,583,109 B2
(45) Date of Patent: Nov. 12, 2013

(54) METHOD AND SYSTEM FOR EXCHANGING NRTRDE FILES BETWEEN A VISITED NETWORK AND A HOME NETWORK IN REAL TIME

(75) Inventors: David Gillot, Brussels (BE); John Yue Jin Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 659 days.

(21) Appl. No.: 12/153,453

(22) Filed: May 19, 2008

(65) Prior Publication Data

US 2008/0293409 A1  Nov. 27, 2008

Related U.S. Application Data

(63) Continuation-in-part of application No. 11/429,448, filed on May 8, 2006.

(60) Provisional application No. 60/679,444, filed on May 9, 2005, provisional application No. 60/907,287, filed on May 18, 2007.

(51) Int. Cl.
    *H04W 4/00* (2009.01)
(52) U.S. Cl.
    USPC ............. 455/432.3; 455/432.1; 455/432.2; 455/433
(58) Field of Classification Search
    USPC ............. 455/432.1–432.3, 410–411, 433; 370/331, 328
    See application file for complete search history.

(56) References Cited

U.S. PATENT DOCUMENTS 5,353,328 A    10/1994  Jokimies
5,586,166 A    12/1996  Turban
5,742,910 A     4/1998  Gallant et al.
(Continued)

FOREIGN PATENT DOCUMENTS

CA    2281041 A1    2/2001
EP    0899 974 A2   3/1999
(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner* — Kathy Wang-Hurst
(74) *Attorney, Agent, or Firm* — Arent Fox LLP

(57) ABSTRACT

The present invention provides a method for facilitating exchange of roaming information between a first gateway and either a Near Real Time Roaming Data Exchange (NRTRDE) agent or second gateway in real time. The method includes obtaining, by a first gateway associated with the VPMN, one or more event parameters in real time from mobile communication of the VPMN's inbound roamer coming from the HPMN. The method further includes generating the roaming information at the first gateway in real time, using one or more obtained event parameters such that the generated roaming information is comprehendible to either an NRTRDE agent associated with the VPMN or a third party vendor, or a second gateway associated with the HPMN. The method further includes providing the roaming information by the first gateway to either the NRTRDE agent or the second gateway in real time.

46 Claims, 4 Drawing Sheets

(56) References Cited

U.S. PATENT DOCUMENTS

| | | | |
|---|---|---|---|
| 5,764,730 A | 6/1998 | Rabe et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,953,653 A | 9/1999 | Josenhans et al. |
| 5,987,318 A | 11/1999 | Alperovich et al. |
| 5,987,323 A | 11/1999 | Huotari |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,212,372 B1 | 4/2001 | Julin |
| 6,356,755 B1 | 3/2002 | Valentine et al. |
| 6,356,756 B1 | 3/2002 | Koster |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,515,974 B1 | 2/2003 | Inoue et al. |
| 6,574,481 B1 | 6/2003 | Rathnasapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,636,502 B1 | 10/2003 | Lager et al. |
| 6,671,523 B1 | 12/2003 | Niepel et al. |
| 6,684,073 B1 | 1/2004 | Joss et al. |
| 6,693,586 B1 | 2/2004 | Walters et al. |
| 6,738,622 B1 | 5/2004 | Stadelmann et al. |
| 6,738,636 B2 | 5/2004 | Lielbridis |
| 6,764,003 B1 | 7/2004 | Martshitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,139,570 B2 | 11/2006 | Elkarat et al. |
| 7,184,764 B2 | 2/2007 | Raviv et al. |
| 7,231,431 B2 | 6/2007 | Sofer et al. |
| 2002/0009199 A1 | 1/2002 | Ala-Laurila et al. |
| 2002/0012351 A1 | 1/2002 | Sofer et al. |
| 2002/0037708 A1 | 3/2002 | McCann et al. |
| 2002/0049065 A1 | 4/2002 | Wallenius |
| 2002/0087631 A1 | 7/2002 | Sharma |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187701 A1 | 12/2002 | Healey |
| 2002/0191575 A1 | 12/2002 | Kalavade et al. |
| 2002/0196775 A1 | 12/2002 | Tuohino et al. |
| 2003/0017843 A1 | 1/2003 | Noblins |
| 2003/0050047 A1 | 3/2003 | Ala/Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0229791 A1 | 12/2003 | De Jong |
| 2004/0019539 A1 | 1/2004 | Raman et al. |
| 2004/0053610 A1 | 3/2004 | Kim |
| 2004/0067781 A1 | 4/2004 | Grech et al. |
| 2004/0082346 A1 | 4/2004 | Skytt et al. |
| 2004/0087305 A1 | 5/2004 | Jiang |
| 2004/0120552 A1 | 6/2004 | Borngraber et al. |
| 2004/0131023 A1 | 7/2004 | Auterinen |
| 2004/0132449 A1 | 7/2004 | Kowarsch |
| 2004/0148400 A1 | 7/2004 | Mostafa |
| 2004/0152463 A1* | 8/2004 | Grootwassink ............ 455/432.3 |
| 2004/0196858 A1 | 10/2004 | Tsai et al. |
| 2004/0203750 A1* | 10/2004 | Cowdrey et al. ........... 455/432.1 |
| 2004/0224680 A1 | 11/2004 | Jiang |
| 2004/0229601 A1 | 11/2004 | Zabawskyj et al. |
| 2004/0236836 A1 | 11/2004 | Appelman |
| 2005/0003831 A1 | 1/2005 | Anderson |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0070278 A1* | 3/2005 | Jiang ......................... 455/432.3 |
| 2005/0186939 A1 | 8/2005 | Barnea et al. |
| 2005/0186960 A1 | 8/2005 | Jiang |
| 2005/0186979 A1 | 8/2005 | McCann et al. |
| 2005/0192007 A1 | 9/2005 | Kumar et al. |
| 2005/0192036 A1 | 9/2005 | Greenwood et al. |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0148459 A1 | 7/2006 | Wolfman et al. |
| 2006/0205404 A1 | 9/2006 | Gonen et al. |
| 2006/0211420 A1 | 9/2006 | Ophir et al. |
| 2006/0252425 A1 | 11/2006 | Jiang |
| 2007/0021118 A1 | 1/2007 | Ophir et al. |
| 2007/0049269 A1 | 3/2007 | Ophir et al. |
| 2007/0054665 A1 | 3/2007 | Elkarat et al. |
| 2007/0072587 A1 | 3/2007 | Della-Torre et al. |
| 2007/0178885 A1 | 8/2007 | Lev et al. |
| 2007/0232300 A1 | 10/2007 | Wolfman |
| 2007/0259663 A1 | 11/2007 | Weintraub et al. |
| 2008/0020760 A1 | 1/2008 | Elkarat et al. |
| 2008/0025295 A1 | 1/2008 | Elliott et al. |

FOREIGN PATENT DOCUMENTS

| | | |
|---|---|---|
| EP | 1389024 | 2/2004 |
| EP | 1622403 | 2/2006 |
| GB | 2322998 | 9/1998 |
| GB | 2424493 | 9/2006 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/56085 | 9/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |

(56) References Cited

FOREIGN PATENT DOCUMENTS

| WO | WO 2004/081802 | 9/2004 |
|---|---|---|
| WO | WO 2004/075598 | 9/2005 |
| WO | WO 2005/101857 | 10/2005 |
| WO | WO 2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein,"Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—53#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); Camel Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q. 765 (1998), Signaling system No. 7—Application transport mechanism.
Q. 766 (1993), Performance objectives in the integrated services digital network application.
Q. 769.1 (1999), Signaling system No. 7—ISDN user part enhancements for the support of Number Portability.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
Q 730 (1999), ISDN User Part supplementary services.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification3rd Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); —Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999).
3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-services Switching Centre (BSS—MSC).
GSM 318 on CAMEL Basic Call Handling; Digital cellular telecommunications system (Phase 2+) Basic call handling; Technical realization (GSM 03.18 version 6.6.0 Release 1997).
GSM 1111 SIM and Mobile Interface.
GSM 1114 SIM Toolkit.
IR 7320 Steering of Roaming.
GSM 348 Security and OTA.
GSM 31048 Security and OTA.
GSM 23119 Gateway Location Register.
GSM 408 Mobile Radio Interface Network Layer.
GSM 23122 Mobile Station Procedure.
GSM 24008 Mobile Radio Interface Network Layer.
GSM 25304 Idle Mode Selection.
GSM 29010 Error Network Mapping.
GSM 29002 MAP Protocol.
3G TS 22.078 version 3.2.0 Release 1999 UMTS CAMEL.
3G TS 23.278 version 6.0.0. Release 6 UMTS Camel-IMS interworking.
GSM 360 GPRS.
GSM 960 GPRS Tunneling Protocol.
GSM 23060 GPRS.
GSM 29060 GPRS Tunneling Protocol.
GSM 23012 Location Update.

(56) References Cited

OTHER PUBLICATIONS

Q1214, ITU-T Intelligent Network Distributed Functional Plane for Intelligent Network CS-1, 1995.
Q1215, ITU-T Physical Plane for Intelligent Network CS-1. 1995.
Q1218 ITU-T Interface Recommendation for Intelligent Network CS-1. 1995.
ITU-T Q.771 Series Q: Switching and Signalling—Specifications of Signalling System No. 7—Transaction capabilities application part. Functional description of transaction capabilities (Jun. 1997).
ITU-T Q.772 Series Q: Switching and Signalling—Specifications of Signalling System No. 7—Transaction capabilities application part. Transaction capabilities information element definitions (Jun. 1997).
ITU-T Q.773 Series Q: Switching and Signalling—Specifications of Signalling System No. 7—Transaction capabilities application part. Transaction capabilities formats and encoding (Jun. 1997).
ITU-T Q.774 Series Q: Switching and Signalling—Specifications of Signalling System No. 7—Transaction capabilities application part. Transaction capabilities procedures. (Jun. 1997).
ITU-T Q.775 Series Q: Switching and Signalling—Specifications of Signalling System No. 7—Transaction capabilities application part. Guidelines for using transaction capabilities. (Jun. 1997).
Q701, Specifications of Signalling System No. 7—Functional Description of the Message Transfer Part (Mtp) of Signalling System No. 7. 1993.
Q702 ITU-T Specifications of Signalling System No. 7, Signalling Data Link. 1993.
Q703 ITU-T Specifications of Signalling System No. 7—Message Transfer Part. Signalling link. 1996.
Q704, Signalling network functions and messages. Specifications of Signalling System No. 7—Message Transfer Part. (Jul. 1996).
Q705, Signalling Network Structure. Specifications of Signalling System No. 7 (Mar. 1993).
Supplementary European Search Report dated Jul. 3, 2008, 6 pages.
Reinhard Becher et al., "CAMEL: The Impact of Personal Communications on Intelligent Networks," XVI World Telecom Congress Proceedings, Sep. 21, 1997, pp. 225-233.
TD.35 NRTRDE Format for Fraud information.
FF.18 NRTRDE Business Requirements.
ETSI CS domain charging documents: TS 12.05.
ETSI CS domain charging documents: TS 32.005.
ETSI CS domain charging documents: TS 32.205.
ETSI CS domain charging documents: TS 32.298.
ETSI PS domain charging documents: TS 12.15.
ETSI PS domain charging documents: TS 32.015.
ETSI PS domain charging documents: TS 32.215.
ETS 300 374-1 Intelligent Network (IN); Intelligent Network Capability Set 1 (CS1); Core Intelligent Network Application Protocol (INAP); Part 1: Protocol specification.
EN 301 140-1 Intelligent Network (IN); Intelligent Network Application Protocol (INAP); Capability Set 2 (CS2); Part 1: Protocol specification.

* cited by examiner

METHOD AND SYSTEM FOR EXCHANGING NRTRDE FILES BETWEEN A VISITED NETWORK AND A HOME NETWORK IN REAL TIME

RELATED APPLICATIONS

This application claims priority from U.S. Provisional Patent Application No. 60/924,525 entitled "Real Time Roaming Data Exchange Service" filed on May 18, 2007, and is a continuation-in-part of U.S. patent application Ser. No. 11/429,448, entitled "Dynamic generation of CSI for inbound roamers" filed on May 8, 2006, claiming priority from a U.S. Provisional Ser. No. 60/679,444, entitled "Dynamic Camel Subscription Creation for Inbound Roamers," filed on May 9, 2005. Each of these related patent applications is incorporated herein by this reference in its entirety.

FIELD OF THE INVENTION

The present invention generally relates to mobile communication. More specifically, the invention relates to real time exchange of Near Real-Time Data Roaming Exchange (NRTRDE) files.

BACKGROUND OF THE INVENTION

Network operators across the world tend to earn a large portion of revenue from their roaming subscribers. Primarily, inbound roamers (i.e., subscribers) are major contributors of roaming revenue for most of the network operators. However, the network operators providing roaming services to the inbound roamers face various challenges—like fraud risk—whenever these subscribers roam outside their home network coverage.

The Global System for Mobile communications (GSM) industry has defined various solutions for limiting that fraud risk. In one such solution, home network operators whose subscribers are roaming in a visited network exchange High Usage Reports (HUR) of its subscribers with the visited network operator. As a result, the visited network operator is able to notify home network operators about potential fraud risks. Although the visited network generally sends the HUR to a home network operator of the inbound roamers in less than thirty six hours after the completion of the inbound roamers' mobile communication (e.g., voice calls or Short Message Service (SMS) or General Packet Radio Service (GPRS)); however, it still leaves sufficient time for fraudsters to cheat. Also, the HUR lacks important information, such as called number, individual call duration, International Mobile Equipment Identity (IMEI) etc.

Another solution to assist the GSM industry in reducing the fraud risk is Fraud Information Gathering System (FIGS) solution by European Telecommunications Standards Institute (ETSI). FIGS is a part of the development of new services for Customized Application for Mobile Enhanced Logic (CAMEL). However, it requires both home and visited network operators to support CAMEL protocol and possess a CAMEL agreement with each other. Moreover, the FIGS solution requires the home network to identify/monitor and flag fraudulent customers before they can use any roaming service in the visited network, which is practically not feasible since all new subscribers' accounts can be monitored only for a certain period. The use of FIGS to monitor all customers is impossible as the required amount of data and signaling may prove to be inefficient and may negatively impact the network capacity. This gives fraudsters the opportunity to commit roaming frauds as flag may be lifted based on the knowledge that monitoring has stopped.

In yet another solution, GSM Association (GSMA) has defined a Near Real-Time Data Roaming Exchange (NRTRDE) guideline to counter the roaming fraud. Unlike FIGS solution, the NRTRDE guideline does neither require the home network operator to identify its fraudulent accounts in advance, therefore increasing the possibility of trapping fraudsters; nor does it require the home and visited network operators to support CAMEL protocol and possess a CAMEL agreement. The NRTRDE guideline that may replace the existing High Usage Reporting (HUR) process has the following two essential functions:

Reduce the required timeframe for delivery of fraud related roaming information from the visited network to the home network from thirty six hours to a maximum of four hours, and Provide individual Call Detail Record (CDR) in sufficient form (i.e., NRTRDE file format) to the home network operator so as to allow the home and visited network operators to cost effectively manage roaming fraud.

Moreover, according to the NRTRDE guideline, the visited network operator is liable for any fraud loss that occurs after expiration of the four hour deadline. One existing approach to create NRTRDE file is based on the adaptation of mediation and billing system at the visited network operator's end. In this case, when the inbound roamer from the home network performs mobile activity while roaming in the visited network, a network element in the visited network (such as Mobile Switching Center (MSC)) generates CDR for this mobile communication. The NRTRDE guideline requires the visited network to collect information from these mobile activities, usually in a raw data format, and deliver them in a normalized format (such as a TD.35 format) to the home network in near real time. The raw CDR generated by the visited network element can be presented in many different formats and usually depends on the type of network elements involved.

Furthermore, in order to support the NRTRDE guideline, the visited network operator needs to filter the roaming information from the raw data. The visited network operator also needs to parse the roaming information into separate NRTRDE files, with each file containing roaming information specific to a single home network. The collection and aggregation of this raw information can also be performed in several ways, although the majority of visited network operators utilize some form of billing and mediation system to automate this activity. Also, the process collection, filtering and parsing of roaming information is at the discretion of the visited network operator. However, it creates the need for a third party vendor to be able to handle and adapt to the different network operator environments (e.g., MSC CDR format, billing and mediation system etc.). Moreover, the process of creating NRTRDE files in the required four hours deadline requires immediate collection of the CDR thus resulting in structural changes of the visited network's billing and mediation system. Furthermore, it involves the periodical extraction of event information (e.g., call duration for Mobile Originating (MO) call etc.) from various network elements; which is usually asynchronous with the actual mobile communication. Hence, the existing process of creating and delivering NRTRDE files to the home network is occurring in near-real time. Every hour of delay in receiving NRTRDE files at the home network is crucial, as it leaves enough time for fraud. In other words, despite reducing timeframe to the four hour deadline for controlling fraud, the fraud risk is still not completely under control.

In accordance with the foregoing, there is a need in the art of a system, a method, and a computer program product, which allow the visited network to create and exchange NRTRDE files with the home network in real time without affecting the existing billing and mediation system of the visited network, so as to reduce the roaming fraud risk.

SUMMARY

The present invention is directed towards a method for exchanging roaming information between a first gateway and either a Near Real Time Roaming Data Exchange (NRTRDE) agent or a second gateway in real time. The first gateway is associated with a Visited Public Mobile Network (VPMN), the NRTRDE agent is associated with the VPMN or a third party vendor, and the second gateway is associated with a Home Public Mobile Network (HPMN). The method includes obtaining, by the first gateway, one or more event parameters in real time from mobile communication of the VPMN's inbound roamer coming from the HPMN. The method further includes generating the roaming information at the first gateway in real time, using one or more obtained event parameters. The generated roaming information is in a format comprehendible to the NRTRDE agent or the second gateway. The method further includes providing the roaming information by the first gateway to either the NRTRDE agent or the second gateway in real time.

Another aspect of the present invention presents a system for exchanging roaming information of a VPMN's inbound roamer, coming from an HPMN, between a first gateway and either an NRTRDE agent or a second gateway in real time. The system includes a first gateway deployed at the VPMN. The first gateway obtains one or more event parameters in real time from mobile communication of the VPMN's inbound roamer coming from the HPMN. Further, the first gateway generates the roaming information in real time, using one or more obtained event parameters. The generated roaming information is in a format comprehendible to either an NRTRDE agent associated with the VPMN or a third party vendor, or a second gateway deployed at the HPMN. Further, the first gateway provides the roaming information to either the NRTRDE agent or the second gateway in real time.

Yet another aspect of the present invention provides a computer program product including a computer usable program code for exchanging roaming information between a first gateway and either an NRTRDE agent or a second gateway, by obtaining using a first gateway associated with the VPMN, one or more event parameters in real time from mobile communication of the VPMN's inbound roamer coming from the HPMN. Further, the computer program product generates the roaming information at the first gateway in real time, using one or more obtained event parameters. The generated roaming information is in a format comprehendible to either an NRTRDE agent associated with the VPMN or a third party vendor, or a second gateway associated with the HPMN. Further, the computer program product provides the roaming information by the first gateway to either the NRTRDE agent or the second gateway in real time.

BRIEF DESCRIPTION OF DRAWINGS

In the drawings, the same or similar reference numbers identify similar elements or acts.

DETAILED DESCRIPTION

Figure 1:
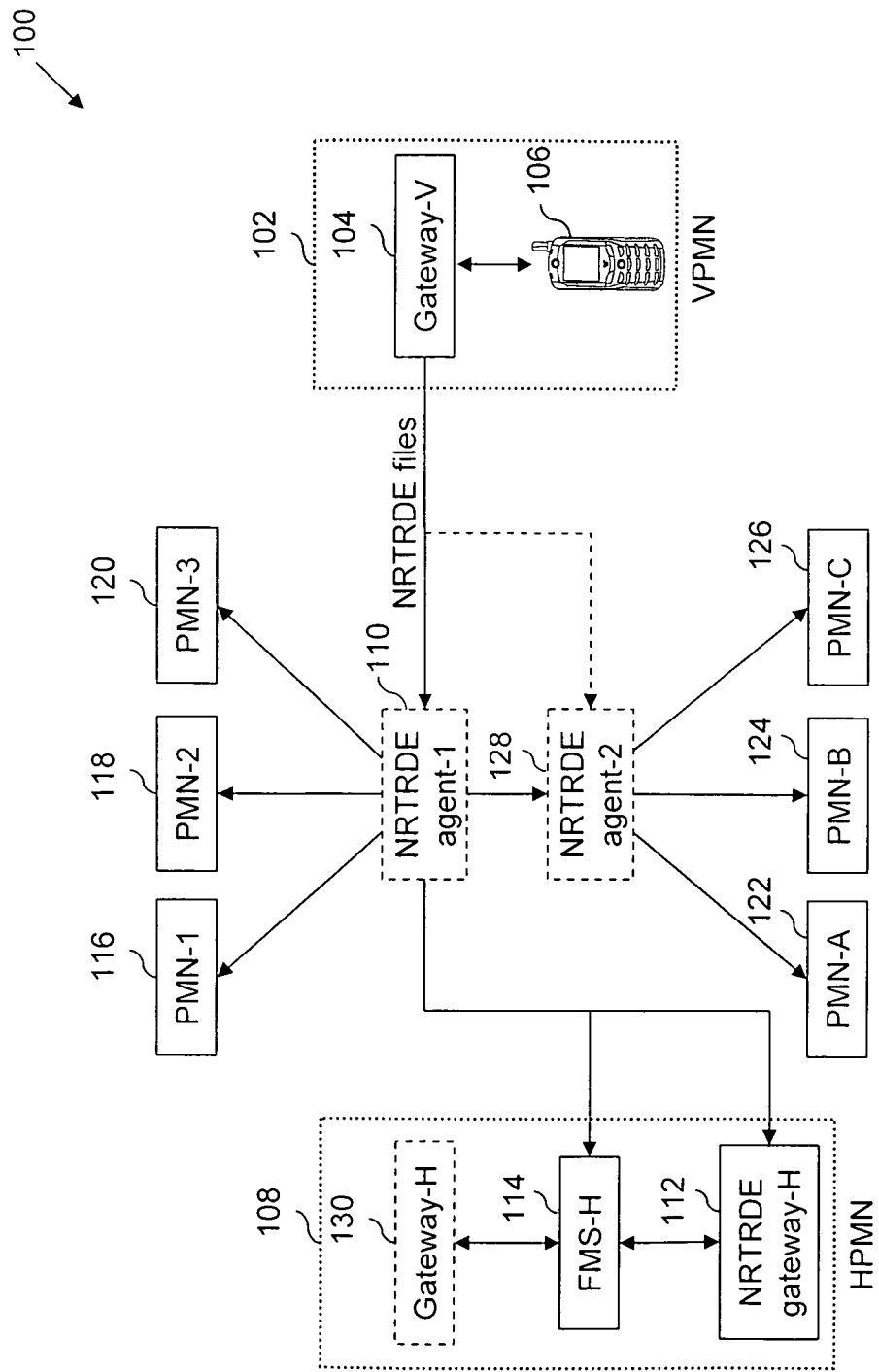
FIG. 1 illustrates a system for exchanging roaming information of Visited Public Mobile Network (VPMN)'s inbound roamers between the VPMN and one or more Home Public Mobile Networks (HPMNs), in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product where a visited network operator, or a party, system or entity working in relation to a visited network operator (an NRTDE Visited Entity), creates Near Real Time Roaming Data Exchange (NRTRDE) files for all inbound roamers from different home networks in real time without causing any change in existing billing and mediation system in the visited network. The visited network operator shares these NRTRDE files with the home network operators within a specified timeframe (for example four hours) after the completion of the inbound roamers' mobile communication (e.g., Mobile Originated (MO)/Mobile Terminated (MT) call, Short Message Service (SMS) or General Packet Radio Service (GPRS)). For example, four hours is a timeframe that might comply with requirement(s) set forth by Global System for Mobile communications Association (GSMA)'s NRTRDE guideline. In an embodiment of the present invention, when an inbound roamer from a home network 'X' completes, say an MO call in the visited network, the NRTDE Visited Entity creates the NRTRDE files for the inbound roamer's MO call in real time, and then can deliver those files to the home network, or a party, system or entity working in relation to that home network operator in real time. NRTDE Visited Entity can send the NRTRDE files at a pre-defined time interval. In one embodiment of the present invention, the NRTRDE Visited Entity sends the NRTRDE files instantaneously when they are created. In another embodiment of the present invention, the Visited NRTRDE Entity files every five to fifteen minutes. This process may be performed upon the occurrence of certain suspect events, too, such as long duration calls or failed call attempts. The NRTRDE files correspond to files that contain roaming information (in form of Call Detail Records (CDRs)) of the inbound roamer that is generated from the inbound roamer's mobile communication in the visited network. In an embodiment of the present invention, roaming information for multiple mobile activities (e.g., MO call, MT call etc.) is present in a single NRTRDE file. In another embodiment of the present invention, roaming information for a single mobile activity (e.g., only MO call) is present in the single NRTRDE file. Hence, due to reduction in time period of exchange of roaming information between the home and visited networks, the home network operator is able to detect possible frauds quite early, thus limiting and minimizing the losses due to roaming fraud.

FIG. 1 illustrates a system 100 that allows a Visited Public Mobile Network (VPMN) 102 (i.e., the visited network) operator to exchange roaming information of its inbound roamers, coming from one or more Home Public Mobile Networks (HPMNs) (i.e., the home networks), with these HPMNs, in accordance with an embodiment of the present invention. In one embodiment of the present invention, VPMN 102 operator, or an entity working in relation to VPMN 102, deploys a gateway-V 104 (i.e., a first gateway) in its network (or connected with its network) to create NRTRDE files for all inbound roamers in real time and to deliver these files to these inbound roamers' corresponding home networks in real time. Alternatively, in another embodiment of the present invention, gateway-V 104 is deployed at a central location (e.g., a hub) for a VPMN, or a group of VPMNs. In this case, VPMN 102 operator shares gateway-V 104 with other VPMNs for real time creation of NRTRDE files for its inbound roamers.

In an embodiment of the present invention, a subscriber 106 from an HPMN 108 registers with VPMN 102. When subscriber 106 (i.e. VPMN 102's inbound roamer) initiates mobile communication in VPMN 102, gateway-V 104 creates NRTRDE files from subscriber 106's mobile communication in VPMN 102 in real time. Detailed explanation for process of creating NRTRDE files is mentioned later in the context of the present invention.

In a first embodiment of the present invention, gateway-V 104 provides the created NRTRDE files to an NRTRDE agent-1 110 (represented by dashed lines in FIG. 1) in real time. NRTRDE agent-1 110 may be a third party vendor such as a Data Clearing House (DCH) or any other external transportation system. In one embodiment of the present invention, NRTRDE agent-1 110 resides between VPMN 102 and HPMN 108. In another embodiment of the present invention, NRTRDE agent-1 110 resides in VPMN 102. An NRTRDE agent is responsible for securely transporting and validating the NRTRDE files between network operators. Furthermore, gateway-V 104 uses protocols (like File Transfer Protocol (FTP) and Hypertext Transport Protocol (HTTP)) supported by NRTRDE agent-1 110, in order to exchange NRTRDE files with NRTRDE agent-1 110 in real time. In one embodiment of the present invention, NRTRDE agent-1 110 delivers the received NRTRDE files to an existing NRTRDE gateway-H 112 in HPMN 108. NRTRDE gateway-H 112 provides the received files to a Fraud Management System (FMS)-H 114 associated with HPMN 108 so as to facilitate early detection of possible fraud at HPMN 108 operator's end. Alternatively, in another embodiment of the present invention, NRTRDE agent-1 110 provides the received files directly to FMS-H 114. In an embodiment of the present invention, FMS 114 is integrated with NRTRDE agent-1 110. In this case, NRTRDE agent-1 110 can send a report to HPMN 108 containing information related to NRTRDE files that helps HPMN 108 detect roaming fraud.

Considering there may be multiple HPMNs whose roamers are registered with VPMN 102, VPMN 102 operator needs to provide the NRTRDE files for inbound roamers from each of these HPMNs to respective HPMNs. In first example, gateway-V 104 exchanges the NRTRDE files for an inbound roamer in VPMN 102, coming from a PMN-1 116, with PMN-1 116 via NRTRDE agent-1 110. It will be apparent to a person skilled in the art that PMN-X (where X may be 1, 2, 3, A, B, C etc.) refers to HPMN whose roamers are registered with VPMN 102. Similarly, gateway-V 104 can exchange the NRTRDE files for inbound roamers from a PMN-2 118 and a PMN-3 120 with PMN-2 118 and PMN-3 120, respectively via NRTRDE agent-1 110. Depending upon feasibility, in an embodiment of the present invention, VPMN 102 operator can use one or more NRTDE agents to transfer the NRTRDE files from VPMN 102 to different HPMNs. In second example, gateway-V 104 exchanges the NRTRDE files for inbound roamers in VPMN 102, coming from a PMN-A 122, a PMN-B 124 and a PMN-C 126, with PMN-A 122, PMN-B 124 and PMN-C 126 via NRTRDE agent-1 110 and an NRTRDE agent-2 128 (represented by dashed lines in FIG. 1). It will be apparent to a person skilled in the art that depending on the implementation, only NRTRDE agent-2 128 may also be used to transfer NRTRDE files from VPMN 102 to HPMN(s).

In accordance with another embodiment of the present invention, in order to avoid using the third party agent i.e., NRTRDE agent-1 110, to exchange NRTRDE files, VPMN 102 operator deploys a gateway-H 130 at HPMN 108. Gateway-H 130 is a second gateway represented by dashed lines in FIG. 1. In this case, gateway-V 104 exchanges the generated NRTRDE files directly with gateway-H 130 in real time. Gateway-H 130 then relays the NRTRDE files to FMS-H 114. In other words, gateway-H 130 is responsible for receiving the NRTRDE files from gateway-V 104 and relaying these files to FMS-H 114 in real time. Furthermore, in case of multiple HPMNs, VPMN 102 operator needs to deploy a gateway (similar to gateway-H 130) at each of these HPMNs.

Figure 2:
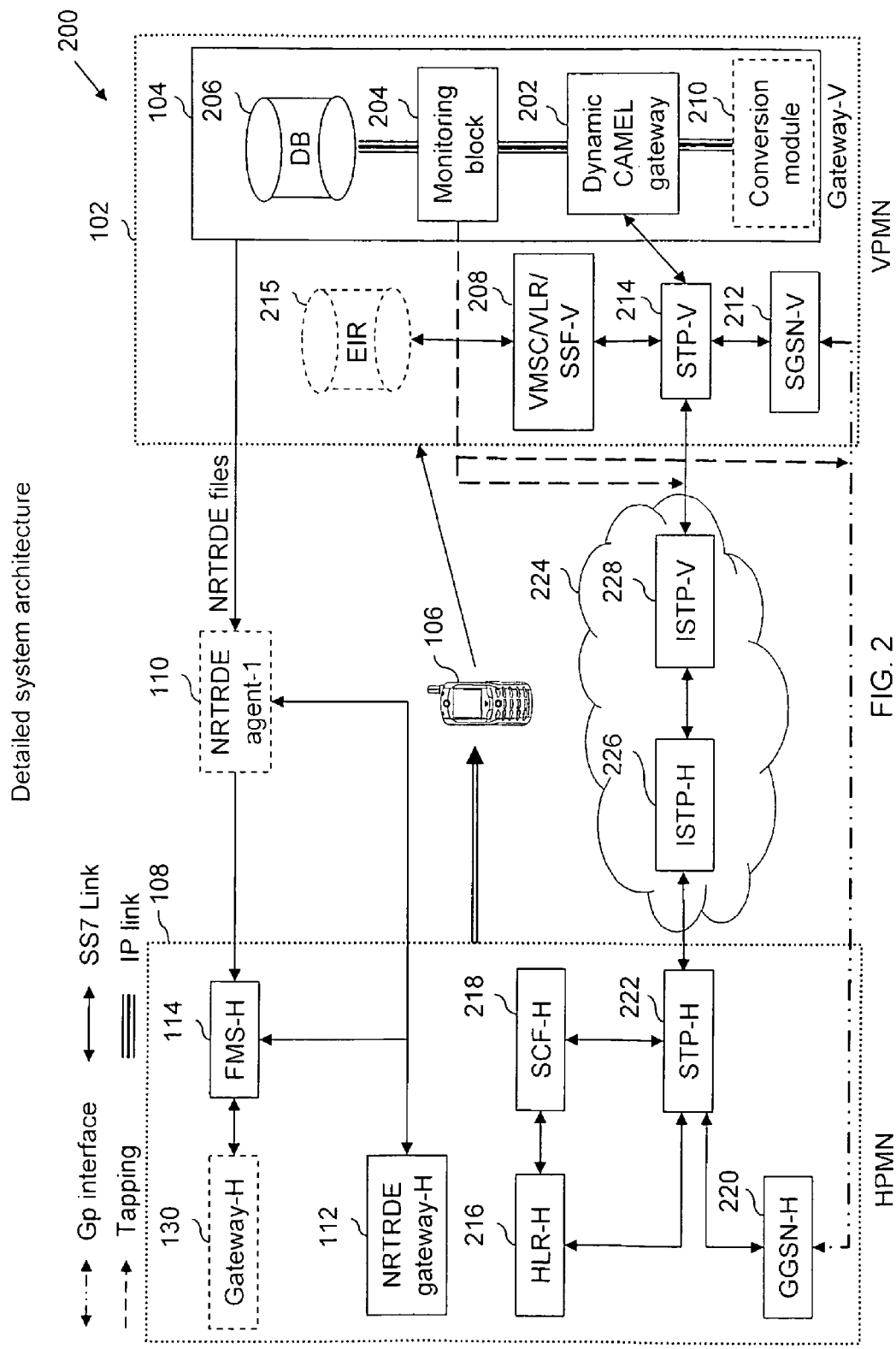
FIG. 2 illustrates a detailed architecture of the system of FIG. 1, in accordance with an embodiment of the present invention.

FIG. 2 illustrates a detailed architecture 200 of system 100, in accordance with an embodiment of the present invention. Gateway-V 104 in VPMN 102 includes a dynamic Customized Application for Mobile Enhanced Logic (CAMEL) gateway 202, a monitoring block 204 and a Database (DB) 206 of inbound roamers. Dynamic CAMEL gateway 202, monitoring block 204 and DB 206 are interconnected, and communicate with each other over an Internet Protocol (IP) link. Additionally, dynamic CAMEL gateway 202 is connected to STPs of VPMN 102 and communicates with various other network elements of HPMN 108 and VPMN 102 by exchanging CAP messages with these network elements. In an embodiment of the present invention, dynamic CAMEL gateway 202 sends an Originating—CAMEL Subscription Information (O-CSI) to a Visited Mobile Switching Center/Visitor Location Register/Service Switching Function (VMSC/VLR/SSF)-V 208 in VPMN 102. Furthermore, monitoring block 204 monitors national and international Signalling Connection Control Part (SCCP) and ISDN User Part (ISUP) roaming signaling links between VPMN 102 and HPMN 108, whereas DB 206 stores inbound roamers' information such as, but not limited to, an International Mobile Subscriber Identity (IMSI), an International Mobile Equipment Identity (IMEI) and a Mobile Station International Subscriber Directory Number (MSISDN). Other functionalities of dynamic CAMEL gateway 202 and monitoring block 204 are explained later in the context of the present invention.

NRTRDE files generated by gateway-V 104 may be in multiple formats such as Comma Separated Values (CSV), eXtensible Markup Language (XML), TD.35 NRTRDE format, TD.57 Transferred Account Procedure (TAP) format and text files. The NRTRDE guideline specifies TD.35 format as a commonly used format. However, depending on VPMN 102 operator's requirement or the transportation system (i.e., NRTRDE agent) used, the data format may vary. For example, NRTRDE agent-1 110 may have capability to convert roaming information in the NRTDE files from XML format to TD.35 format, thus eliminating the need of receiving roaming information in only TD.35 format. Alternatively, gateway-V 104 may also include a conversion module 210 (represented by dashed lines in FIG. 2) for converting the format of the roaming information in the NRTRDE files into a format that NRTRDE agent-1 110 comprehends, before providing the NRTRDE files to NRTRDE agent-1 110. In an embodiment of the present invention, gateway-V 104 interfaces with multiple HPMNs and possibly multiple NRTRDE agents, where each NRTRDE agent may comprehend a different format (such as CSV or XML). In this case, gateway-V 104 may first create the NRTRDE files in TD.35 format and then use conversion module 210 to convert it into a format (e.g., XML) that the recipient NRTRDE agent understands. In an exemplary case, when NRTRDE agent-1 110 understands XML data format, conversion module 210 converts the TD.35 format of NRTRDE file generated by gateway-V 104 into XML format. In another exemplary case, in case gateway-V 104 interfaces with NRTRDE agent-2 128 that understands say CSV data format, conversion module 210 converts the TD.35 format of NRTRDE file generated by gateway-V 104 into the CSV format. Similarly, if gateway-V 104 directly interfaces with gateway-H 130 for exchange of NRTRDE files, gateway-V 104 (using conversion module 210 if format conversion is required) sends the NRTRDE files in a format that gateway-H 130 comprehends. Conversion module 210 is interconnected with other modules in gateway-V 104, and communicates with these modules over the IP link.

Architecture 200 further includes in VPMN 102, a Serving GPRS Support Node (SGSN)-V 212 and a Signal Transfer Point (STP)-V 214. Gateway-V 104, VMSC/VLR/SSF-V 208 and STP-V 214 are interconnected, and communicate with each other over Signaling System #7 (SS7) links (represented by solid lines in FIG. 2). Similarly, STP-V 214 and SGSN-V 212 are interconnected, and communicate with each other over SS7 links. VPMN 102 may optionally include an Equipment Identity Register (EIR) 215 database (represented by dashed lines in FIG. 2) that stores information for mobile handsets (e.g., IMEI of subscriber 106's mobile handset). Also, HPMN 108 includes a Home Location Register (HLR)-H 216, a Service Control Function (SCF)-H 218, a Gateway GPRS Support Node (GGSN)-H 220 and an STP-H 222. HLR-H 216, SCF-H 218 and STP-H 222 are interconnected, and communicate with each other over SS7 links. Similarly, STP-H 222 and GGSN-H 220 are interconnected, and communicate with each other over SS7 links, whereas SGSN-V 212 communicates with GGSN-H 220 via a Gp interface (represented by long dashed and dotted lines in FIG. 2). Monitoring block 204 monitors this Gp interface between SGSN-V 212 and GGSN-H 220 for GPRS signaling exchange. The monitoring of SCCP and ISUP roaming signaling links (or GPRS signaling) can be done passively by tapping on SS7 links (or the Gp interface) between VPMN 102 and HPMN 108, or actively by intercepting SCCP and ISUP roaming signaling messages (or Packet Data Protocol (PDP) session and data exchanges between SGSN-V 212 and GGSN-H 220) between VPMN 102 and HPMN 108. Various embodiments of the present invention consider the passive monitoring based approach, although it will be apparent to a person skilled in the art that active monitoring based approach can be similarly applied. Moreover, it will be apparent to a person skilled in the art that in case VPMN 102 and HPMN 108 reside in different countries, architecture 200 will also include an International Service Carrier (ISC) 224 between VPMN 102 and HPMN 108. ISC 224 includes a first International STP (ISTP)-H 226 that communicates with STP-H 222 and a second ISTP-V 228 that communicates with STP-V 214. It will also be apparent to a person skilled in the art that VPMN 102 and HPMN 108 may also include various other network components, depending on the architecture under consideration.

Figure 3:
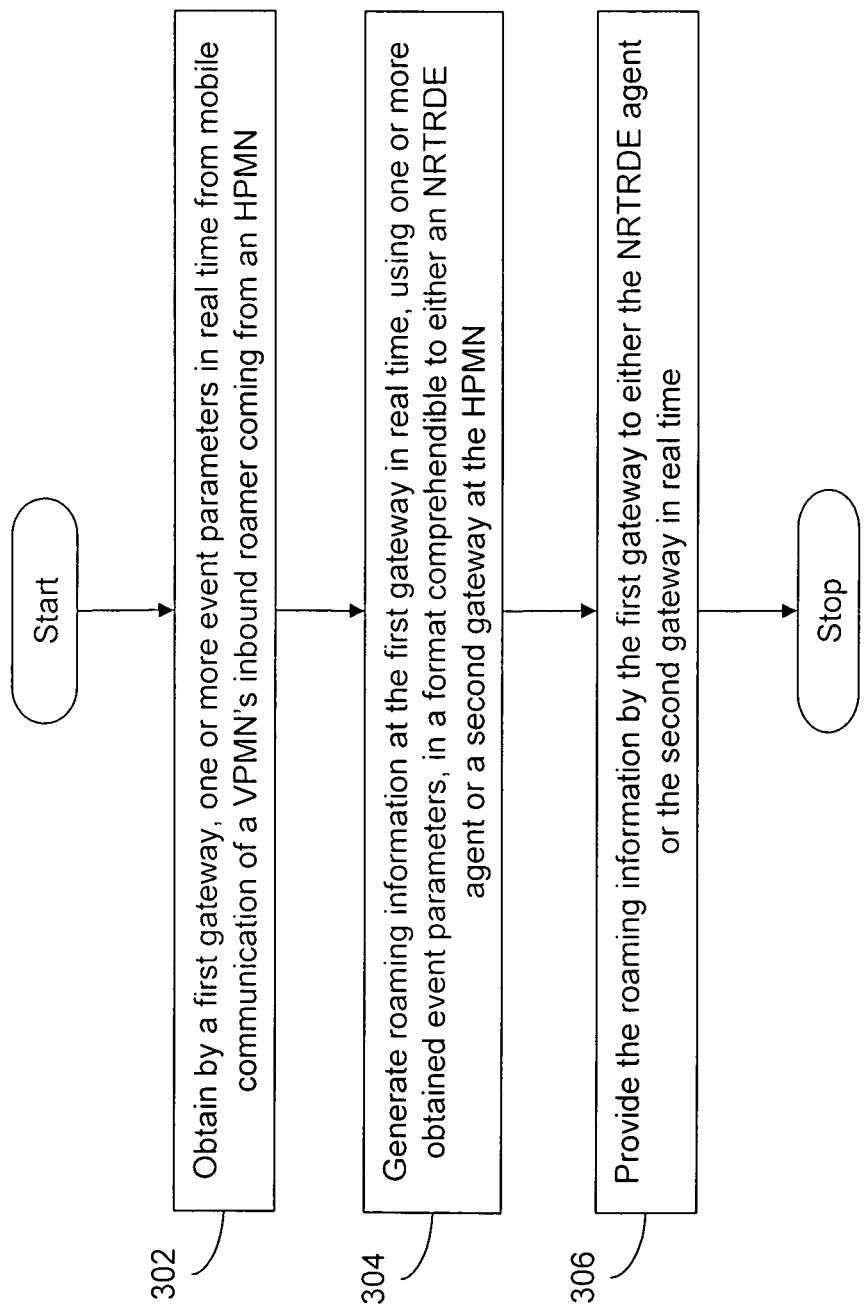
FIG. 3 represents a flowchart for facilitating real time exchange of inbound roamer's roaming information between the VPMN and either a Near Real Time Roaming Data Exchange (NRTRDE) agent or a gateway associated with the HPMN, in accordance with an embodiment of the present invention.

In order to create NRTRDE files, VPMN 102 (a Visited NRTRDE Entity) using gateway-V 104 needs to first obtain event parameters that need to be written in the NRTRDE files from subscriber 106's mobile communication in VPMN 102. FIG. 3 represents a flowchart for facilitating real time exchange of subscriber 106's roaming information between VPMN 102 and either NRTRDE agent-1 110 or gateway-H 130, in accordance with an embodiment of the present invention. At step 302, gateway-V 104 obtains one or more event parameters (like IMSI, IMEI, call start time, call duration and various other parameters described later in the context of the present invention) from subscriber 106's mobile communication in VPMN 102. Event parameters correspond to those parameters that are generated during or after a particular mobile communication (e.g., MO call event parameters include IMSI, IMEI etc.) by subscriber 106 in VPMN 102. In an embodiment of the present invention, gateway-V 104 obtains these event parameters during (or after the completion of) subscriber 106's ongoing mobile communication in VPMN 102. In order to obtain the event parameters, gateway-V 104 uses its modules (dynamic CAMEL gateway 202, monitoring block 204 or DB 206, or a combination thereof) depending on the event parameter to be retrieved and VPMN 102's roaming capability. In an embodiment of the present invention, dynamic CAMEL gateway 202 (or in combination with monitoring block 204) is used in case VPMN 102 supports CAMEL protocol. In another embodiment of the present invention, monitoring block 204 is used in case VPMN 102 does not Support CAMEL protocol. Detailed explanation of the process of retrieval of event parameter in CAMEL and non-CAMEL support cases are mentioned later in the context of the present invention.

Further at step 304, gateway-V 104 generates roaming information in real time using the obtained event parameters. In accordance with a first embodiment of the present invention, generating roaming information involves gateway-V 104 to store the obtained event parameters in DB 206. Thereafter, gateway-V 104 selects some event parameters from the stored parameters that are required to generate the roaming information, and then aggregates the selected event parameters so as to create an NRTRDE file upon completion of the inbound roamer's mobile communication. These selected event parameters may also be used to create a flat file, which is converted into the NRTRDE file before it reaches HPMN 108. In an embodiment of the present invention, once gateway-V 104 has obtained event parameters, such as called party, calling party, IMSI, IMEI etc. from an MO call by subscriber 106 in VPMN 102, gateway-V 104 stores these parameters in its DB 206, and then selects only IMSI and IMEI from the stored parameters to populate the NRTRDE file.

Alternatively, in a second embodiment of the present invention, gateway-V 104 generates the roaming information by creating flat files (or NRTRDE files) from selected event parameters obtained at gateway-V 104 during the mobile communication of subscriber 106 in VPMN 102. In other words, gateway-V 104 directly selects event parameters from the obtained event parameters without requiring gateway-V 104 to store these event parameters in DB 206, and then writes the selected event parameters in flat files (or NRTRDE files). In an embodiment of the present invention, gateway-V 104 creates either complete roaming information or partial roaming information, (e.g., in case of long duration calls and unsuccessful call attempts) to populate the NRTRDE or flat files. Since TD.35 is the default format in which the roaming information is generated by gateway-V 104, gateway-V 104 may convert (if required) the generated roaming information into a format that a receiving party (i.e., NRTRDE agent-1 110 or gateway-H 130) understands. In another embodiment of the present invention, gateway-V 104 sends the generated roaming information to NRTRDE agent-1 110 (or gateway-H 130) without any conversion in case the generated roaming information is itself in a format that NRTRDE agent-1 110 (or gateway-H 130) understands.

Finally at step 306, gateway-V 104 provides the generated roaming information (i.e. contained in the NRTRDE files) to either NRTRDE agent-1 110 or gateway-H 130 in real time. In an embodiment of the present invention, gateway-V 104 provides NRTRDE files to NRTRDE agent-1 110 (or gateway-H 130) in a 'push' mode. In this case, NRTRDE files are pushed to NRTRDE agent-1 110 (or gateway-H 130) using VPMN 102 operator's specific protocol such as, but not limited to, FTP and HTTP. Gateway-V 104 stores the generated NRTRDE files in a predefined directory on a server associated with gateway-V 104. In an embodiment of the present invention, gateway-V 104 has a configurable timer (a 'Periodic File Upload Timer') to upload NRTRDE files to NRTRDE agent-1 110 (or gateway-H 130) periodically. Upon expiry of the Periodic File Upload Timer, gateway-V 104 transfers all the NRTRDE files (can either include complete CDR or a partial CDR) that are closed by gateway-V 104 to a predefined (i.e., configured by VPMN 102 operator in gateway-V 104) directory location in NRTRDE agent-1 110 (or gateway-H 130). In another embodiment of the present invention, gateway-V 104 deposits the NRTRDE files in a specific directory on the server known to NRTRDE agent-1 110 or gateway-H 130. In this case, NRTRDE agent-1 110 or gateway-H 130 picks these files from the specified directory. In both of the above mentioned cases of NRTRDE files exchange, once NRTRDE agent-1 110 (or gateway-H 130) receives the NRTRDE files, it can then transfer these files to FMS-H 114 for further processing (like detection of possible fraud) as described above.

As mentioned above, gateway-V 104 needs to first obtain event parameters from subscriber 106's mobile communication in VPMN 102. Various embodiments of the present invention use gateway-V 104 to not only monitor subscriber 106's call/SMS-related events, but also monitor the registration process of subscriber 106 with VPMN 102. Moreover, gateway-V 104 not only records all data necessary for identifying the inbound roamers (e.g., their respective MSISDNs, IMSIs, IMEIs etc.) but also can profile features like their CSIs. The methodology used to obtain these parameters is dependent on whether VPMN 102 supports the required CAMEL protocol version, and whether HPMN 108 has provided CSI for subscriber 106 for that particular mobile communication (e.g., CAMEL phase 2 O-CSI for MO call, etc.). In other words, depending on VPMN 102's CAMEL support capabilities, gateway-V 104 can either actively monitor all call/SMS/GPRS events or be hosted in hybrid mode (i.e., in active mode during MO call, while in passive mode during MT call and/or MO/MT SMS). In order to handle these two approaches (i.e., CAMEL supported and CAMEL not supported), gateway-V 104 supports various protocols such as, but not limited to, GSM Mobile Application Part (MAP), CAMEL, ISUP and Intelligent Network Application Part (INAP). It will be apparent to a person skilled in the art that gateway-V 104's protocol support can be extended to Interim Standard 41 (IS-41) and Wireless Intelligent Network (WIN) in future.

CAMEL Approach

This approach considers that VPMN 102 supports CAMEL protocol version required for obtaining event parameters from the mobile communication, irrespective of HPMN 108's support for CAMEL protocol. For example, in order for gateway-V 104 to obtain event parameters from an MO call in VPMN 102 using CAMEL approach, VPMN 102 needs to support O-CSI (i.e., minimum CAMEL phase 1 support). Similarly, in order to obtain event parameters from an MT call in VPMN 102 using CAMEL approach, VPMN 102 needs to support VMSC Terminating (VT)-CSI (i.e., minimum CAMEL phase 3 support). Additionally, for handling MO SMS, MT SMS and GPRS using CAMEL approach, VPMN 102 needs to support MO-SMS-CSI (i.e., minimum CAMEL phase 3 support), MT-SMS-CSI (i.e., minimum CAMEL phase 4 support) and GPRS-CSI (i.e., minimum CAMEL phase 3 support), respectively. However, in case VPMN 102 does not support the CSI (e.g., VT-CSI not in Camel phase 2) that is required for obtaining event parameters from corresponding mobile communication (i.e., MT call), then the event parameters for that particular case can be obtained using non-Camel approach described later in the context of the present invention.

In an earlier approach, U.S. patent application, publication no. 20060252425, filed on May 8, 2006, described a method and system for dynamic generation of CSI for inbound roamers. That description is hereinafter referred to as "previous dynamic CSI filing". In an embodiment of the present invention, gateway-V 104 (i.e., using monitoring block 204) detects that subscriber 106 has no CSI information provided by his HPMN 108 during subscriber 106's registration process with VPMN 102. In such a case, dynamic CAMEL gateway 202 can dynamically create O-CSI (i.e., for MO call), VT-CSI (i.e., for MT call), MO-SMS-CSI (i.e., for MO SMS), MT-SMS-CSI (i.e., for MT SMS) and GPRS-CSI (i.e., for MO/MT GPRS) when VMSC/VLR/SSF-V 208 supports CAMEL phase 4. Thereafter, dynamic CAMEL gateway 202 can send these CSI parameters in a standalone Insert Subscriber Data (ISD) message to VMSC/VLR/SSF-V 208. In an embodiment of the present invention, dynamic CAMEL gateway 202 detects the type of CAMEL version capability of VMSC/VLR/SSF-V 208 by monitoring (i.e., using monitoring block 204) a Location Update (LUP) message of subscriber 106 exchanged between VMSC/VLR/SSF-V 208 and HLR-H 216. This situation of dynamic creation and insertion of CSI is explained in detail in the previous dynamic CSI filing.

Similarly, in another embodiment of the present invention, HPMN 108 may provide CSI (e.g., CAMEL phase 1 O-CSI) for subscriber 106, whose CAMEL version Support is less than the CAMEL version Support for the required CSI (i.e., CAMEL phase 2 O-CSI for MO call) for dynamic CAMEL gateway 202 to obtain the event parameters from subscriber 106's mobile communication (i.e., MO call) in VPMN 102. In such a case, dynamic CAMEL gateway 202 can replace HPMN 108's provided CSI with the required CSI. Dynamic CAMEL gateway 202 performs this replacement by sending a standalone Delete Subscriber Data (DSD) message to VMSC/VLR/SSF-V 208 so as to remove HPMN 108's provided CSI from VMSC/VLR/SSF-V 208, and then sending the required CSI in the standalone ISD message to VMSC/VLR/SSF-V 208. Due to the addition of the CSI at VMSC/

VLR/SSF-V 208 by dynamic CAMEL gateway 202, all call and SMS control signaling (i.e., Initial DP (IDP) messages) of subscriber 106 are routed to dynamic CAMEL gateway 202, which then can obtain event parameters from these signaling messages in real time. It will be apparent to a person skilled in the art that in case of GPRS, dynamic CAMEL gateway 202 exchanges signaling messages (e.g., standalone ISD, standalone DSD, IDP etc.) with SGSN-V 212 (i.e., instead of VMSC/VLR/SSF-V 208).

Furthermore, in an embodiment of the present invention, during subscriber 106's registration process with VPMN 102, gateway-V 104 detects that subscriber 106 has the required CSI (i.e., CAMEL phase 2 O-CSI, CAMEL phase 3 VT-CSI etc.). In this case, dynamic CAMEL gateway 202 sends the standalone ISD message to VMSC/VLR/SSF-V 208 after the completion of subscriber 106's registration process at VPMN 102; with O-CSI, VT-CSI, MO-SMS-CSI and MT-SMS-CSI set to either its own Global Title (GT) or GT of SCF-H 218 that has a special prefix added corresponding to dynamic CAMEL gateway 202. Now since VMSC/VLR/SSF-V 208 is imitated with dynamic CAMEL gateway 202 as SCF-H address of subscriber 106, whenever VMSC/VLR/SSF-V 208 receives an indication for subscriber 106's mobile communication (e.g., MO/MT call or SMS) in VPMN 102, VMSC/VLR/SSF-V 208 issues the CAP IDP message (e.g., CAP2 MO IDP, CAP3 MT IDP, CAP3 MO-SMS-IDP or CAP4 MT-SMS-IDP) to dynamic CAMEL gateway 202. Thereafter, dynamic CAMEL gateway 202 either removes the special prefix from the CAP IDP message or replaces its own GT with the actual SCF-H 218 address, so as to obtain the actual SCF-H 218 address, and it then routes the CAP IDP message to the actual SCF-H 218. By using the special prefix approach, VPMN 102 operator is able to handle the case of dynamic CAMEL gateway 202 failure. In this case, STP-V 214 removes the special prefix from the GT of SCF-H 218 and routes all signaling messages, directly to SCF-H 218 without affecting the services of VPMN 102's inbound roamers. In an embodiment of the present invention, dynamic CAMEL gateway 202 modifies an SCCP Calling Party Address (CgPA) in the received CAP IDP message to its own address corresponding to VMSC/VLR/SSF-V 208 address, prior to relaying the CAP IDP message to SCF-H 218 address. Modification of SCF-H address or the SCCP CgPA of the CAP message is dependent on the network capability to route selectively the CAP IDP messages to dynamic CAMEL gateway 202. For example, STP-V 214 can route signaling messages to dynamic CAMEL gateway 202 based on Sub System Number (SSN) (e.g., CAMEL), SCCP CgPA (e.g., a network other than VPMN 102) and SCCP Called Party Address (CdPA) (e.g., a network other than VPMN 102). In such a case, the modifications of SCF-H and SCCP CgPA are not required.

In another embodiment of the present invention, in case dynamic CAMEL gateway 202 detects that VMSC/VLR/SSF-V 208 supports only CAMEL phase 3 protocol, then dynamic CAMEL gateway 202 sends the standalone ISD message to VMSC/VLR/SSF-V 208 after the completion of subscriber 106's registration process at VPMN 102; with O-CSI, VT-CSI and MO-SMS-CSI (with no modification in SCF-H address of MT-SMS-CSI) set to its own GT as SCF-H 218 GT. Thus, all MO calls, MT calls and MO SMS of subscriber 106 are received at VMSC/VLR/SSF-V 208, which then issues a CAP IDP (i.e., call (or SMS) control) to dynamic CAMEL gateway 202. Dynamic CAMEL gateway 202 then obtains event parameters (like answer, disconnect etc in case of MO/MT call and busy, failure etc. in case of MO/MT SMS) from the received CAP IDP message. Moreover, by exchanging CAP messages between VMSC/VLR/SSF-V 208 and network nodes in HPMN 108 (i.e., SCF-H 218 and HLR-H 216) via dynamic CAMEL gateway 202, dynamic CAMEL gateway 202 obtains all event parameters of MO/MT call and SMS required for generating roaming information of subscriber 106.

Alternatively, in another embodiment of the present invention, instead of using detection procedure to obtain event parameters for MO and MT calls, dynamic CAMEL gateway 202 sends a call information request message (i.e., an event parameter request message) to VMSC/VLR/SSF-V 208, which causes VMSC/VLR/SSF-V 208 to return call information report after completion of the call. Since call information report contains event parameters such as, 'Call Attempt Elapsed Time', 'Call Stop Time', 'Call Connected Elapsed Time' and 'Release Cause' for subscriber 106's MO (or MT) call in VPMN 102, dynamic CAMEL gateway 202 extracts these event parameters as they are required to create the NRTRDE file. However, in order to obtain MT-SMS event parameters in case VMSC/VLR/SSF-V 208 support only CAMEL phase 3 protocol, gateway-V 104 uses the non-CAMEL approach described later in the context of the present invention. Similarly, in yet another embodiment of the present invention, in case VMSC/VLR/SSF-V 208 supports only CAMEL phase 2 protocol then dynamic CAMEL gateway 202 would set only O-CSI to its own GT. Even in this case, gateway-V 104 obtains MT-Call, MO-SMS and MT-SMS event parameters using the non-CAMEL approach.

In case the CAP message received at dynamic CAMEL gateway 202 from SCF-H 218 does not contain some event monitoring (e.g., busy, no answer, answer, connect, disconnect etc.) for call, dynamic CAMEL gateway 202 adds such event monitoring or call information request to the CAP message before relaying the CAP message to VMSC/VLR/SSF-V 208. In one embodiment of the present invention, when SCF-H 218 sends the Connect message to dynamic CAMEL gateway 202, dynamic CAMEL gateway 202 adds the missing event monitoring, i.e., RRB in the received Connect message and then relays it to VMSC/VLR/SSF-V 208. In another embodiment of the present invention, in case the CAP message does not contain some event monitoring for SMS, dynamic CAMEL gateway 202 adds such event monitoring (e.g., busy, failure etc.) to the CAP message before relaying it to VMSC/VLR/SSF-V 208. In both these cases, dynamic CAMEL gateway 202 does not relay the acknowledgement (i.e., ERB), it receives from VMSC/VLR/SSF-V 208 to SCF-H 218

Figure 4:
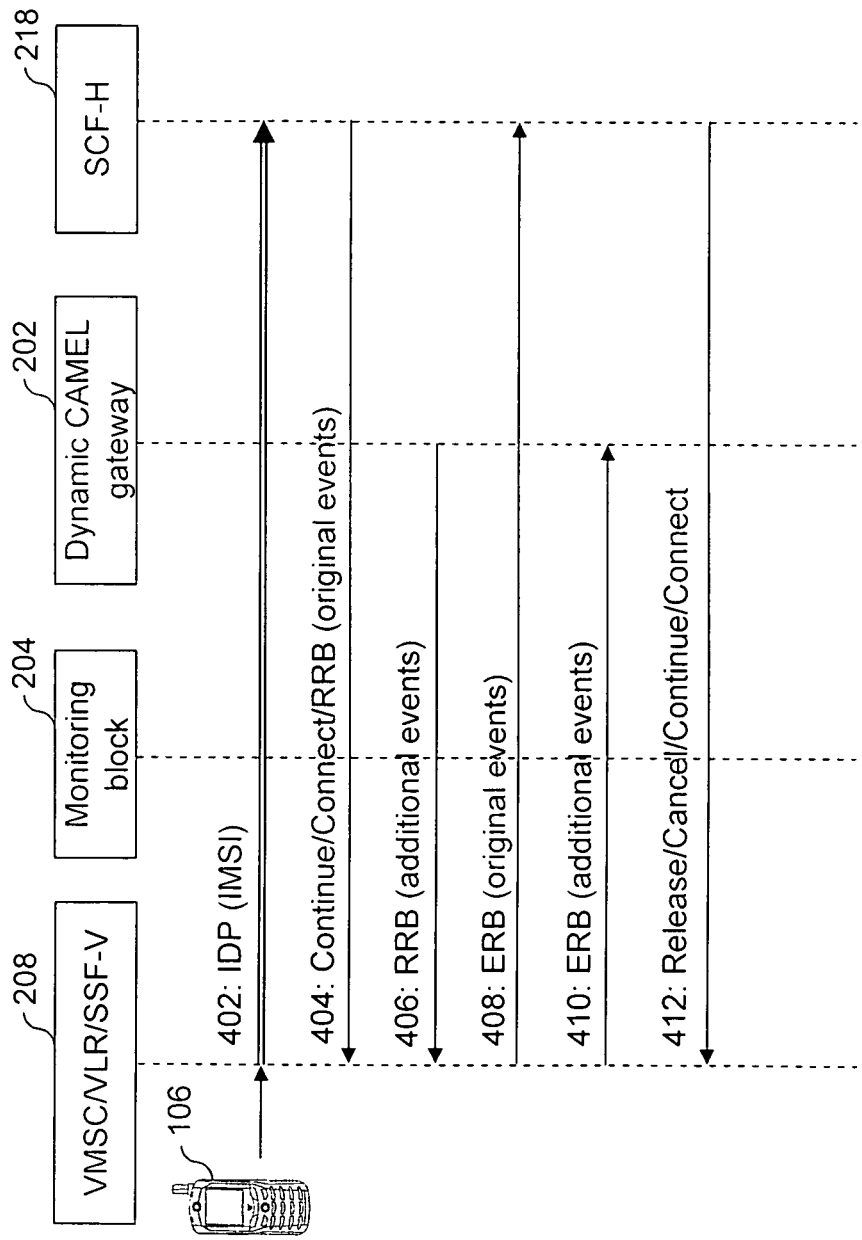
FIG. 4 represents a flow diagram for dynamically inserting missing events during a Mobile Originated (MO) call by the inbound roamer in the VPMN, in accordance with an embodiment of the present invention.

Above explained CAMEL approach is applicable only in case VPMN 102 supports CAMEL phase 2 or above. Various embodiment of the present invention also present a solution where VPMN 102 operator is able to obtain event parameters from mobile communication of subscriber 106 even when VPMN 102 supports only CAMEL phase 1. FIG. 4 represents a flow diagram for dynamic insertion of missing events (e.g., OAnswer. ODisconnect and OAbandon) during the MO call by subscriber 106 in VPMN 102, in accordance with an embodiment of the present invention. In CAMEL Phase 1 supported VPMN 102, dynamic CAMEL gateway 202 acts as a CAMEL relay, in addition to passively monitoring CAP exchange between VMSC/VLR/SSF-V 208 and SCF-H 218 using monitoring block 204. When subscriber 106 initiates the MO call in VPMN 102, at step 402, VMSC/VLR/SSF-V 208 issues a CAP IDP on an IMSI of subscriber 106 to SCF-H 218. Monitoring block 204 detects this CAP IDP message and obtains subscriber 106's IMSI from it. Further, at step 404, when SCF-H 218 returns an answer message, such as a Continue message or a Connect message or a Request Report Basic (RRB) call state model message containing original events to VMSC/VLR/SSF-V 208, monitoring block 204 identifies that the answer message does not contain some events. Hence at step 406, dynamic CAMEL gateway 202 issues another RRB message (i.e., the event parameter request message) to VMSC/VLR/SSF-V 208, in order to fill the missing events (e.g., OAnswer, ODisconnect arm and OAbandon). In another embodiment of the present invention, in case dynamic CAMEL gateway 202 is actively intercepting CAP messages exchanged between VMSC/VLR/SSF-V 208 and SCF-H 218, and dynamic CAMEL gateway 202 detects absence of events in a CAP message received from SCF-H 218, it adds the missing events in the CAP message prior to relaying it to VMSC/VLR/SSF-V 208. Thereafter, at step 408, VMSC/VLR/SSF-V 208 returns a CAP Event Report Basic (ERB) call state model message to SCF-H 218. Thereafter, at step 410, VMSC/VLR/SSF-V 208 issues another ERB message (i.e., an event parameter result message) containing additional events (i.e., event reports corresponding to the RRB message sent at step 406), to dynamic CAMEL gateway 202. Finally, at step 412, SCF-H 218 issues a release (or Cancel or Continue or Connect) message to VMSC/VLR/SSF-V 208.

Similarly, in another embodiment of the present invention, in order to obtain event parameters from VPMN 102 (i.e., for MT call and MO/MT SMS) that has CAMEL Phase 2 capabilities, dynamic CAMEL gateway 202 acts as the CAMEL relay, in addition to monitoring block 204 acting as monitoring module passively detecting CAP exchange between VMSC/VLR/SSF-V 208 and SCF-H 218. In this case, when SCF-H 218 returns the answer message to VMSC/VLR/SSF-V 208, monitoring block 204 identifies that the answer message does not contain the call information report request. Hence dynamic CAMEL gateway 202 sends the call information report request to VMSC/VLR/SSF-V 208 so as to obtain the call information report from VMSC/VLR/SSF-V 208.

Like MO call, gateway-V 104 can also dynamically insert events, which are absent in original events, during the MT call to subscriber 106 in VPMN 102, in accordance with an embodiment of the present invention. The call flow for dynamic insertion of events for MT call is same as that of dynamic insertion of events in case of MO call. Furthermore, in case of emergency calls (TS 12), VMSC/VLR/SSF-V 208 may bypass the CAMEL messages directly to SCF-H 218 without relaying through dynamic CAMEL gateway 202. In order to handle these emergency calls, VPMN 102 operator implements a complementary INAP Capability Set No. 1 (CS-1), INAP CS-2 variants or ISUP signaling monitoring so as to create NRTRDE files for emergency calls, in accordance with an embodiment of the present invention.

Non-CAMEL Approach

This approach considers that VPMN 102 may support some CAMEL capabilities; however, it lacks CAMEL protocol version capability required for obtaining event parameters from the mobile communication (e.g., VT-CSI not supported for MT call), irrespective of HPMN 108's support for CAMEL protocol. In an embodiment of the present invention, in case VPMN 102 does not support an IN interface for MO/MT call, then by monitoring ISUP and MAP signaling messages at SS7 links using monitoring block 204, gateway-V 104 obtains all MO/MT call event parameters (e.g., call reference from ISUP parameters for MO call and MAP Provide Roaming Number (PRN) for MT call, IMSI, call duration, etc.) required to create the NRTRDE files.

In another embodiment of the present invention, in case VPMN 102 supports the IN interface for MO call, then VPMN 102 operator configures all VMSCs in VPMN 102 to issue call control signaling on all inbound roamers to dynamic CAMEL gateway 202. In this case, call related events can be handled using IN triggers. Furthermore, when the MO call by subscriber 106 arrives at VMSC/VLR/SSF-V 208, VMSC/VLR/SSF-V 208 creates static IN trigger profile and sends an IN IDP message to dynamic CAMEL gateway 202. In an embodiment of the present invention, VPMN 102 configures VMSC/VLR/SSF-V 208 with static IN trigger profile for MO calls by subscriber 106 in VPMN 102. In this way, dynamic CAMEL gateway 202 obtains NRTRDE MO-call event parameters in the similar manner as explained above in the CAMEL approach for MO calls, i.e., by requesting event reports or call information reports. Similarly, in yet another embodiment of the present invention, in case VPMN 102 supports the IN interface for MT call, then VPMN 102 operator configures all VMSCs in VPMN 102 to issue call control signaling on all inbound roamers to dynamic CAMEL gateway 202. In this case, when MT call on a Mobile Station Roaming Number (MSRN) arrives at a Gateway MSC (GMSC) associated with VPMN 102, VPMN 102 GMSC creates static IN trigger profile and sends an IN IDP message to dynamic CAMEL gateway 202. In other words, for each MSRN received, VPMN 102 operator initiates an INAP dialogue with dynamic CAMEL gateway 202. In an embodiment of the present invention, in order to handle simbox-related/interconnect bypass case for MT call, VPMN 102 operator configures its MSCs (i.e., to which simbox is attached) for additional triggering so as to route the IN IDP message to dynamic CAMEL gateway 202. In another embodiment of the present invention, VPMN 102 operator's MSC blocks the MO calls towards MSRN. SIM Box fraud is the unauthorized use of GSM gateways used to bypass the international gateways for toll and interconnect. This results in revenue losses and other major problems for the affected operator. In this way, dynamic CAMEL gateway 202 obtains NRTRDE MT-call event parameters in the similar manner as explained above in the CAMEL approach for MT calls.

In yet another embodiment of the present invention, in order to obtain event parameters (e.g., IMSI, destination number, Short Message Service Center (SMSC) number, etc.) from MO and MT SMS of subscriber 106 in VPMN 102, gateway-V 104 uses monitoring block 204 to monitor a MAP_FORWARD_SM (Submit SM) message (i.e., in case of MO SMS), a MAP_FORWARD_SM (Deliver SM) (i.e., in case of MT SMS) and other MAP messages at SS7 links between HPMN 108 and VPMN 102. Additionally, gateway-V 104 can also obtain event parameters from MT SMS delivered over GPRS. It will be apparent to a person skilled in the art that in case of MT SMS over GPRS. VMSC/VLR/SSF-V 208 is replaced with SGSN-V 212. Similarly, in order to obtain event parameters (e.g., IMSI, APN, etc.) from MO and MT GPRS of subscriber 106 in VPMN 102, gateway-V 104 uses monitoring block 204 to monitor MAP messages at SS7 links between VPMN 102 and HPMN 108, and PDP session and data messages at the Gp interface.

Long Duration Calls

As Per the NRTRDE Guideline:

"If an event is of long duration, and causes partial records to be produced at a VPMN, these partial records must be provided to the HPMN within 4 hours of the end time of the partial CDR. In the NRTRDE requirement, the VPMN is recommended to create a partial CDR every 4 hours to minimize fraud loss exposure for the HPMN. At a minimum, the VPMN is required to generate a partial record every 24 hours for any call offer 24 hours in duration. The partial record creation interval of a VPMN must be stated in GSMA PRD AA.14.

Note that the HPMN may not receive a partial NRTRDE recording for up to 4 hours plus the partial record production interval at the VPMN. This potential constraint at the VPMN will diminish the capability of the HPMN to perform rapid fraud detection for ongoing events, however, it is felt by GSMA that a stronger requirement would increase the NRTRDE implementation burden on operators, and consequently decrease the rate of take up of NRTRDE solutions."

Long duration calls can therefore render NRTRDE approach ineffective. However, in accordance with various embodiments of the present invention, gateway-V 104 deployed by VPMN 102 operator can produce partial records at any time interval (i.e., pre-defined by VPMN 102 operator) and send them to HPMN 108 in real time. In an embodiment of the present invention, VPMN 102 operator defines the long duration calls using (gateway-V 104. For example, VPMN 102 operator can configure gateway-V 104 to treat an MO (or MT) call that is longer than one hour as a long duration call. In another embodiment of the present invention, gateway-V 104 has a configurable timer for generating partial CDR for the long duration calls. Thus, when an MO call (or an MT call) starts (e.g., an Answer message received/detected at gateway-V 104), gateway-V 104 begins 'Partial CDR Timer' for that call, and sets a 'Partial CDR Counter' to zero. In case, the call continues even after expiry of 'Partial CDR Timer', then gateway-V 104 generates partial CDR, increments the 'Partial CDR Counter' and adds the 'Partial CDR Counter' in the CDR.

Furthermore, in an embodiment of the present invention, for long duration calls in VPMN 102, irrespective of CAMEL support, gateway-V 104 also generates and provides intermediate short duration NRTRDE files (in TD.35 format) to HPMN 108. In one embodiment of the present invention, this short duration is configurable, e.g., 15 minutes, by VPMN 102 operator. In another embodiment of the present invention, VPMN 102 operator configures the short duration in a tiered format, e.g., first report after 30 minutes, and then subsequent reports every 15 minutes. In case VPMN 102 supports CAMEL phase 2 protocol or above, gateway-V 104 also adds Apply Charging Request to define the maximum duration for an event report to be received at dynamic CAMEL gateway 202, in accordance with an embodiment of the present invention.

As explained above, various event parameters need to be obtained from the mobile communication for creating the NRTRDE file. Various embodiments of the present invention describe different types of mobile communications and procedures for retrieving event parameters necessary to create NRTRDE file:

MO Call

Under the conditions of MO call, the following event parameters are used to populate the NRTRDE file. Some of these parameters are mandatory, while others are optional or conditional.

1. IMSI (Mandatory): In case VPMN 102 supports CAMEL/IN protocol, IMSI information present in the CAP/INAP IDP message is received at dynamic CAMEL gateway 202, from which gateway-V 104 obtains the IMSI. In case, VPMN 102 is a non-CAMEL network, gateway-V 104 uses monitoring block 204 to monitor ISUP and MAP signaling of subscriber 106 in VPMN 102, in order to obtain subscriber 106's IMSI and MSISDN. Moreover, it will be apparent to a person skilled in the art that while the IMSI is present in an INAP CS-2 message; it is however not present in the standard INAP CS-1 message. In case of INAP CS-1 message, VMSC/VLR/SSF-V 208 includes the IMSI in an extra field of the IDP message. However, in case the IMSI cannot be found in the IDP message, gateway-V 104 locates the same from its DB 206 containing subscriber 106's profile information (that includes IMSI of subscriber 106) that is built when monitoring block 204 detects subscriber 106's registration procedure (i.e., in case of MO call) with VPMN 102, or subscriber 106's MAP PRN procedure (i.e., in case of MT call).

2. IMEI (Conditional): VPMN 102 operator can obtain IMEI using following two approaches:

EIR Available Approach

In this approach, VPMN 102 possesses EIR 215 database as described above. In a first embodiment of the present invention, VPMN 102 operator identifies, for each subscriber IMSI, IMEI information by monitoring (i.e., using monitoring block 204) signaling messages (such as a MAP_Check_IMEI message) exchanged between VMSC/VLR/SSF-V 208 and EIR 215. In a second embodiment of the present invention, VPMN 102 operator uses gateway-V 104 to identify the IMEI of subscriber 106 by polling EIR 215 with subscriber 106's IMSI. In this case, EIR 215 maps the stored IMEI with subscriber 106's IMSI and returns the IMEI information to gateway-V 104. In a third embodiment of the present invention, when gateway-V 104 receives the MAP_Check_IMEI message (i.e., an event parameter check message) from VMSC/VLR/SSF-V 208, gateway-V 104 relays the received message to EIR 215. When EIR 215 returns the IMEI in a confirmation message, gateway-V 104 obtains the IMEI from the confirmation message.

EIR Not Available Approach

This case considers that VPMN 102 operator does not possess an EIR database to obtain IMEI corresponding to subscriber 106's IMSI. Now in order to obtain the IMEI, gateway-V 104 acts like an EIR database, in accordance with a first embodiment of the present invention. In such a case, VPMN 102 operator configures its VMSC/VLR/SSF-V 208 to check the IMEI with subscriber 106's IMSI against gateway-V 104. Gateway-V 104 then processes the MAP_Check_IMEI message, obtains the IMEI & IMSI from this message and returns a positive acknowledgement to the calling VMSC/VLR/SSF-V 208 indicating that IMEI is correct. Thus, gateway-V 104 can also act as a standard EIR database, in addition to acting as special signaling node that only obtains event parameters, generates roaming information and provides roaming information to HPMN 108. In a second embodiment of the present invention, VPMN 102 operator configures gateway-V 104 to request IMEI on subscriber 106's IMSI from VMSC/VLR/SSF-V 208. Based on VMSC/VLR/SSF-V 208 capabilities, gateway-V 104 either sends a MAP_Obtain_IMEI message or a MAP_Provide_Subscriber_Info message (both messages correspond to an event parameter obtain message) to VMSC/VLR/SSF-V 208 so as obtain the IMEI event parameter from VMSC/VLR/SSF-V 208.

Alternatively, in case VPMN 102 supports Camel 4 Release 5 capability, CAP IDP messages (i.e., call control signaling) of subscriber 106 received at dynamic CAMEL gateway 202 contain IMEI and IMSI parameters, which allows VPMN 102 operator to obtain the IMEI of subscriber 106 from MO and MT calls/SMS/GPRS.

3. Call Event Start Time (Mandatory): In case VPMN 102 supports CAMEL phase 2 or above, call event start time is present in the CAP IDP received at dynamic CAMEL gateway 202. However, in case VPMN 102 supports CAMEL phase 1, call event start time is obtained by recording the time instant when dynamic CAMEL gateway 202 relays a CAP message, received from VMSC/VLR/SSF-V 208, to SCF-H 218. In case VPMN 102 supports IN protocol, i.e., for INAP calls, the call information report received from VMSC/VLR/SSF-V 208 contains the call duration and the call stop time. Gateway-V 104 then deduces the call event start time from these two fields. Alternatively, in case VPMN 102 does not Support CAMEL protocol, gateway-V 104 uses monitoring block 204 to detect ISUP IAM messages at ISUP signaling links between VPMN 102 and HPMN 108. Gateway-V 104 then obtains the call event start time from the monitored ISUP IAM messages.

4. Coordinated Universal Time (UTC) Time Offset (Mandatory): In case VPMN 102 supports CAMEL protocol, the timestamp for the MO call is directly provided in CAMEL IDP messages. Gateway-V 104 then determines the corresponding UTC time of the event. In case VPMN 102 does not support CAMEL protocol, gateway-V 104 records the timestamp (e.g., using an internal clock at gateway-V 104 that is synchronized with VPMN 102 operator's core network) at detection of the signaling message (i.e., INAP or ISUP).

5. Call Event Duration (Mandatory): Call event duration is present in the call information report in case VPMN 102 supports CAMEL phase 2 or IN protocol. However, in case VPMN 102 supports CAMEL phase 1, gateway-V 104 obtains the call event duration by calculating the time difference between an answer notification and a disconnect notification received/detected at gateway-V 104. In case VPMN 102 does not support CAMEL protocol, gateway-V 104 uses monitoring block 204 to detect ISUP messages (i.e., IAM, ANM, REL etc.) and obtain the call event duration.

6. Cause for Termination (Mandatory): Following are the possible causes (with their corresponding prefix numbers, i.e., 0, 1, 2 etc.) for termination of mobile communication:
   0 normal release
   1 partial record
   2 partial record call re-establishment
   3 Unsuccessful call attempt
   4 Stable call abnormal termination
   5 CAMEL initiated call release
   Unsuccessful call attempt (3) is indicated in the call information report in case VPMN 102 supports CAMEL protocol or IN protocol. CAMEL initiated call release (5) is indicated in a CAP message from SCF-H 218. In case VPMN 102 does not support CAMEL protocol, normal release (0) is indicated when gateway-V 104 detects an ISUP REL message after successful establishment of the MO call (i.e., detection of Answer Message (ANM) at gateway-V 104), and unsuccessful call attempt (3) is based on detection of call release (i.e., REL message) without successful establishment of the MO call (i.e., no ANM message detected). Moreover, irrespective of VPMN 102's support for CAMEL protocol, the partial record (1) indication is based on the expiry of the 'Partial CDR Timer'.

7. Teleservice Code (Mandatory): Teleservice code is present in the CAP IDP message (i.e., VPMN 102 supports CAMEL) and hence gateway-V 104 obtains this code directly from the CAP IDP message received at dynamic CAMEL gateway 202. In case VPMN 102 does not support CAMEL, monitoring block 204 obtains this event parameter from ISUP IAM message parameters (i.e., ATI, USI etc.).

8. Bearer Service Code (Mandatory): In case VPMN 102 supports CAMEL protocol or IN protocol, Bearer Service code is present in the CAP/INAP IDP message received at dynamic CAMEL gateway 202, and hence gateway-V 104 obtains the bearer service code directly from this message. In case VPMN 102 does not Support CAMEL, monitoring block 204 obtains this event parameter from ISUP IAM message parameters (i.e., ATI, USI etc.).

9. Supplementary Service Code (Conditional): This parameter indicates the reason for invoking conditional call forwarding in conjunction with the MO call. In case VPMN 102 supports CAMEL protocol or IN protocol, this code is present in the CAP message under 'Redirecting Reason' field or in the INAP under 'Redirection Information' field. In case VPMN 102 does not support CAMEL, monitoring block 204 obtains this event parameter from ISUP IAM message parameters (i.e., Redirecting Info etc.).

10. Dialed Digits (Conditional): In case VPMN 102 supports CAMEL protocol, dialed digits are present in the CAP IDP message (i.e., Called Party/called BCD). It will be apparent to a person skilled in the art that dialed digits must also be present in case of unsuccessful call attempts. In case VPMN 102 does not support CAMEL, monitoring block 204 obtains this event parameter from ISUP IAM message parameters (i.e., called Info etc.), in case there is no other interaction at the network level (e.g., short call translation, call correction, etc.).

11. Connected Number (Conditional): In case VPMN 102 supports CAMEL protocol, connected number is present in a CAP CONNECT message (i.e., Called Party/called BCD). In case VPMN 102 does not support CAMEL, monitoring block 204 obtains this event parameter from ISUP IAM message parameters (i.e., called Info etc.). It will be apparent to a person skilled in the art that this event parameter is formatted in international E.164 and present for all calls except: 1) use of the basic service emergency call, and 2) unsuccessful call attempt.

12. Third Party Number (Conditional): The Third Party Number is the number identifying the original calling party in a conditional call forwarding context. In case VPMN 102 supports CAMEL protocol, third party number is present in the CAP IDP message. In case VPMN 102 does not support CAMEL, monitoring block 204 obtains this event parameter from ISUP IAM message parameters (i.e., redirecting info etc.).

13. Recording Entity Identification (Mandatory): The recording entity represents the E.164 number of the visited network's MSC producing the roaming information for inbound roamers. In case VPMN 102 supports CAMEL protocol, this event parameter is present in the CAP IDP message. In case VPMN 102 does not support CAMEL, monitoring block 204 obtains this event parameter by monitoring subscriber 106's registration with VPMN 102.

14. Call Reference (Conditional): In case VPMN 102 supports CAMEL protocol, this event parameter is present in the CAP IDP message. In case VPMN 102 does not support CAMEL, monitoring block 204 obtains this event parameter from ISUP IAM message parameters (i.e., call reference etc.). Since this event parameter is an optional field at ISUP level, VPMN 102 operator still ensures that VMSC/VLR/SSF-V 208 includes this parameter in its ISUP IAM message. Since this event parameter is conditional therefore, its unavailability at ISUP has no impact on the validity of the NRTRDE file.

15. Charge Amount (Optional): Irrespective of VPMN 102's support for CAMEL protocol, gateway-V 104 calculates the charge amount based on VPMN 102 operator's IOT structure, call destination number and the call duration.

MT Call

Some of the event parameters that are used to populate the NRTRDE file in case of MT call are common as those required for MO call. Moreover, even the procedure for retrieving following parameters for MT call is similar as explained above for MO call. Some of these parameters are mandatory, while others are optional or conditional.
1. IMSI
2. IMEI
3. Call Event Start Time
4. UTC Time Offset
5. Call Event Duration
6. Cause for Termination
7. Teleservice Code
8. Bearer Service Code
9. Charge Amount Furthermore, only following event parameters have a different retrieval process for MT call.
1. Calling Number (Conditional): In case VPMN 102 supports CAMEL protocol or IN protocol, calling number (if available at ISUP side when arriving at VMSC/VLR/SSF-V 208) is present in the CAP/INAP IDP message. In case VPMN 102 does not support CAMEL protocol, monitoring block 204 obtains this event parameter from ISUP IAM message.
2. Recording Entity Identification (Mandatory): In case VPMN 102 supports CAMEL protocol, this event parameter is present in the CAP IDP message. In case VPMN 102 does not Support CAMEL protocol, monitoring block 204 obtains this MT call event parameter from monitoring of subscriber 106's registration with VPMN 102 and ISUP IAM message.
3. Call Reference (Conditional): In case VPMN 102 supports CAMEL protocol, this event parameter is present in the CAP IDP message. In case VPMN 102 does not Support CAMEL protocol, monitoring block 204 obtains this MT call event parameter from monitoring of MAP PRN message and ISUP IAM message monitoring.

MO SMS

Under the conditions of MO SMS, the following event parameters are used to populate the NRTRDE file. Some of these parameters are mandatory, while others are optional or conditional.
1. IMSI (Mandatory): In case VPMN 102 supports CAMEL/IN protocol, IMSI information is present in the CAP/INAP IDP message that is received at dynamic CAMEL gateway 202. It will be apparent to a person skilled in the art that the IMSI is not present in a MAP_FORWARD_SM message. Thus, in case VPMN 102 does not support CAMEL protocol, gateway-V 104 identifies the IMSI from its DB 206 by matching the MSISDN present in the MAP_FORWARD_SM message with the IMSI recorded (i.e., stored in DB 206) during the monitoring of subscriber 106's registration process with VPMN 102.
2. IMEI (Conditional): Retrieval process of IMEI for MO SMS is same as IMEI retrieval process for MO call described above.
3. Call Event Start Time (Mandatory): In case VPMN 102 supports CAMEL/IN protocol, call event start time is present in a CAP IDP SMS message received at dynamic CAMEL gateway 202. However, in case VPMN 102 does not support CAMEL protocol, gateway-V 104 obtains the call event start time by recording the time instant when monitoring block 204 detects the MAP message containing the required event parameter.
4. UTC Time Offset (Mandatory): Retrieval process of UTC Time Offset for MO SMS is same as UTC Time Offset retrieval process for MO call described above in case VPMN 102 does not support CAMEL protocol. However, in case VPMN 102 supports CAMEL protocol, gateway-V 104 obtains this event parameter from the CAP IDP SMS received at dynamic CAMEL gateway 202.
5. Call Event Duration (Mandatory): In the case of SMS, this event parameter is always set to zero.
6. Cause for Termination (Mandatory): Gateway-V 104 identifies unsuccessful SMS attempt at MAP level or from a CAP event report.
7. Teleservice Code (Mandatory): Since teleservice code for MO SMS is 22, gateway-V 104 always uses this default code to create the NRTRDE file.
8. Bearer Service Code (Mandatory): This event parameter is not required once teleservice code is defined.
9. Dialed Digits (Conditional): Gateway-V 104 obtains these Dialed digits from the MAP_FORWARD_SM (Destination address) message or the CAP IDP SMS (Destination subscriber number).
10. Connected Number (Mandatory): Gateway-V 104 obtains the connected number event parameter from the MAP_FORWARD_SM message or the CAP IDP SMS message. It will be apparent to a person skilled in the art that the connected number, in the case of SMS, is an SMSC E.164 address.
11. Recording Entity Identification (Mandatory): Gateway-V 104 obtains the recording entity identification event parameter from the CAP IDP SMS message or the MAP_FORWARD_SM message.
12. Call Reference (Conditional): Gateway-V 104 obtains the call reference event parameter from the CAP IDP SMS (SMS reference number). However, this event parameter is not present in the MAP_Forward_SM message. Since this event parameter is conditional, such a situation is acceptable and does not affect the creation of the NRTRDE file for subscriber 106.
13. Charge Amount (Optional): Retrieval process of charge amount for MO SMS is same as charge amount retrieval process for MO call described above, except that dependency on call duration is not applicable in case of SMS.

MT SMS

Some of the event parameters that are used to populate the NRTRDE file in case of MT SMS are common as that required for MO SMS. Moreover, even the procedure for retrieving following parameters for MT SMS is similar as explained above for MO SMS. Some of these parameters are mandatory, while others are optional or conditional.
1. IMEI
2. Call Event Start Time
3. UTC Time Offset
4. Call Event Duration
5. Cause for Termination
6. Bearer Service Code 7. Recording Entity Identification
8. Call Reference
9. Charge Amount Furthermore, only following event parameters have a different retrieval process for MT SMS.

1. IMSI (Mandatory): In case VPMN 102 supports CAMEL/IN protocol, IMSI information is present in the CAP/INAP IDP message received at dynamic CAMEL gateway 202. However, in case VPMN 102 does not Support CAMEL protocol, gateway-V 104 obtains the IMSI from the MAP_FORWARD_SM message.
2. Teleservice Code (Mandatory): Since teleservice code for MO SMS is 21, gateway-V 104 always uses this default code to create the NRTRDE file.
3. Calling Number (Mandatory): It will be apparent to a person skilled in the art that the calling number, in the case of MT SMS, is an SMSC that sends the SMS to subscriber 106. Gateway-V 104 obtains the calling number event parameter from the MAP_FORWARD_SM (Calling SCCP address or Relay Protocol (RP)-Originating-Address in the RP-MT-DATA Relay Protocol Data Unit (RPDU), if available) or the CAP IDP SMS (SMSC address).

GPRS

Under the conditions of GPRS event, the following event parameters are to be present in the NRTRDE file:

1. IMSI (Mandatory): Gateway-V 104 obtains IMSI from a CAP IDP GPRS message and a MAP_CREATE PDP_CONTEXT message.
2. IMEI (Conditional): Retrieval process of IMEI for GPRS is same as IMEI retrieval process for MO call described above.
3. Call Event Start Time (Mandatory): It refers to the time instant when the MAP_CREATE_PDP_CONTEXT message is captured by monitoring block 204. This event parameter is also present in the CAP IDP GPRS message, and hence gateway-V 104 retrieves this parameter using dynamic CAMEL gateway 202 that receives the CAP IDP GPRS message.
4. UTC Time Offset (Mandatory): Retrieval process of UTC time offset for GPRS is same as UTC time offset retrieval process for MO SMS described above in case VPMN 102 does not support CAMEL. However, in case VPMN 102 supports CAMEL protocol, gateway-V 104 obtains this event parameter from the CAP IDP GPRS received at dynamic CAMEL gateway 202.
5. Call Event Duration (Mandatory): Gateway-V 104 obtains this parameter by calculating the time difference between the MAP_CREATE_PDP_CONTEXT message and a MAP_DELETE_PDP_CONTEXT message. In case VPMN 102 supports CAMEL, gateway-V 104 obtains the call event duration from event reports or ApplyCharging reports received at dynamic CAMEL gateway 202.
6. Cause for Termination (Mandatory): Following are the possible causes (with their corresponding prefix numbers, i.e., 0, 4, 5 etc.) for termination of mobile communication:
   0 normal release
   4 Stable call abnormal termination
   5 CAMEL initiated call release
   16 Volume limit
   17 Time limit
   18 SGSN change
   19 Maximum change conditions
   20 Management intervention
   21 Intra SGSN intersystem change In case VPMN 102 supports CAMEL, gateway-V 104 obtains this event parameter from a CAMEL Entity Released GPRS message. Using monitoring block 204, VPMN 102 operator identifies if the GPRS session is released normally or abnormally. TS 132.015 clarify the causes:—
   Normal release (0): PDP context release or GPRS detach
   Data volume limit (16), time limit (17), SGSN change (18) or maximum
   change conditions (19): partial CDR generation
   Abnormal termination (4): PDP context or MM context
   Management intervention (20): Request due to Operation and
   Maintenance (O&M) reasons
7. Access Point Name (APN) NI (Mandatory): Gateway-V 104 obtains this event parameter from the MAP_CREATE_PDP_CONTEXT message or the CAP IDP GPRS message.
8. Access Point Name OI (Mandatory): Gateway-V 104 obtains this event parameter from the MAP_CREATE_PDP_CONTEXT message or the CAP IDP GPRS message.
9. Data Volume Incoming (in bytes) (Mandatory): Gateway-V 104 obtains this event parameter from monitoring of the Gp interface using monitoring block 204.
10. Data Volume Outgoing (in bytes) (Mandatory): Gateway-V 104 obtains this event parameter from monitoring of the Gp interface using monitoring block 204.
11. SGSN Address (Mandatory): Gateway-V 104 obtains an SGSN IP address from a MAP_CREATE_PDP_CONTEXT (request) message exchanged between SGSN-V 212 and GGSN-H 220.
12. GGSN address (Mandatory): Gateway-V 104 obtains a GGSN IP address from a MAP_CREATE_PDP_CONTEXT (response) message or the CAP IDP GPRS message.
13. Charging ID (Mandatory): Gateway-V 104 obtains this event parameter from the MAP_CREATE-PDP_CONTEXT (response) message or the CAP IDP GPRS message.
14. Charge Amount (Conditional): Gateway-V 104 obtains this event parameter based on VPMN 102 operator's IOT structure, the volume exchanged and the APN used.

A VPMN operator uses one or more variations of the present invention to provide roaming information (created from MO and MT call/SMS/GPRS events) of VPMN's inbound roamers, coming from one or more HPMNs, to these HPMNs in real time without causing any change in VPMN's existing billing and mediation system. The VPMN operator can generate the roaming information for even long duration calls or failed call attempts by/to the inbound roamers. Moreover, the roaming information contained in the NRTRDE files is generated in a format that a receiving party (e.g., an NRTRDE agent) comprehends. This is beneficial for the HPMN operators as they are able to detect any possible roaming fraud quickly. Additionally, the gateway of the present invention can be deployed at a central location for a group of VPMNs, thereby reducing costs of hardware and software and saving implementation effort and logistics.

The present invention can take the form of an entirely hardware embodiment, an entirely software embodiment, or an embodiment containing both hardware and software elements. In accordance with an embodiment of the present invention, the invention is implemented in software, which includes but is not limited to firmware, resident software, microcode, etc.

Furthermore, the invention can take the form of a computer program product, accessible from a computer-usable or computer-readable medium, providing program code for use by, or in connection with, a computer or any instruction execution system. For the purposes of this description, a computer-usable or computer readable medium can be any apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CDROM), compact disk-read/write (CD-R/W), and Digital Versatile Disk (DVD).

A computer usable medium provided herein includes a computer usable program code, which when executed, facilitates real time exchange of roaming information of VPMN's an inbound roamer between a VPMN and an HPMN of the inbound roamer. In order to do so, the VPMN operator uses a first gateway to obtain one or more event parameters in real time from mobile communication of the inbound roamer. The computer program product further includes a computer usable program code for generating the roaming information at the first gateway in real time, using one or more obtained event parameters. The generated roaming information is in a format that is comprehendible to either an NRTRDE agent associated with the VPMN or a third party vendor, or a second gateway associated with the HPMN. The computer program product further includes a computer usable program code for providing the roaming information by the first gateway to either the NRTRDE agent or the second gateway in real time.

The components of the present system described above include any combination of computing components and devices operating together. The components of the present system can also be components or subsystems within a larger computer system or network. The present system components can also be coupled with any number of other components (not shown), for example, other buses, controllers, memory devices, and data input/output devices, in any number of combinations. In addition, any number or combination of other processor-based components may be carrying out the functions of the present system.

It should be noted that the various components disclosed herein may be described using computer aided design tools, and/or expressed (or represented) as data and/or instructions, embodied in various computer-readable media, in terms of their behavioral, register transfer, logic component, transistor, layout geometries, and/or other characteristics. Computer-readable media, in which such formatted data and/or instructions may be embodied, include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole, and not to any particular portions of this application. When the word "or" is used in reference to a list of two or more items, that word covers all of the following interpretations of the word: any of the items in the list, all of the items in the list, and any combination of the items in the list.

The above description of illustrated embodiments of the present system is not intended to be exhaustive or to limit the system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for exchanging roaming information of VPMN's inbound roamers between the VPMN and HPMNs of inbound roamers in real time. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier-telecommunications in which end users are normally configured to operate within a "home" network to which they normally subscribe, but have the capability of also operating on other neighboring networks, which may even be across international borders.

The examples under the system of the present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, Wimax, VoIP, HSDPA, SIP, IMS, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| ANSI-41 | American National Standards Institute #41 |
| CAMEL | Customized Application for Mobile Enhanced Logic |
| CAP | Camel Application Part |
| CdPA | Called Party Address |
| CgPA | Calling Party Address |
| CDR | Call Detail Record |
| CSI | Camel Subscription Information |
| DSD | MAP Delete Subscriber Data |
| EIR | Equipment Identity Register |
| ERB | CAP Event Report Basic call state model |
| FMS | Fraud Management System |
| FTP | File Transfer Protocol |
| GMSC | Gateway MSC |
| GPRS | General Packet Radio Service |
| GSM | Global System for Mobile communication |
| GSMA | GSM Association |
| GT | Global Title |
| HLR | Home Location Register |
| HLR-H | HPMN HLR |
| HPMN | Home Public Mobile Network |
| HTTP | Hypertext Transport Protocol |
| IAM | Initial Address Message |
| IDP | Initial DP IN/CAP message |
| IMEI | International Mobile Equipment Identity |
| IMSI | International Mobile Subscriber Identity |
| IN | Intelligent Network |
| INAP | Intelligent Network Application Part |
| IP | Internet Protocol |
| ISC | International Service Carrier |
| ISD | MAP Insert Subscriber Data |
| ISTP | International STP |
| ISUP | ISDN User Part |
| LUP | MAP Location Update |
| MAP | Mobile Application Part |
| MO | Mobile Originated |
| MSC | Mobile Switching Center |
| MSISDN | Mobile Station International Subscriber Directory Number |
| MSRN | Mobile Station Roaming Number |
| MT | Mobile Terminated |
| O-CSI | Originating CSI |
| PDP | Packet Data Protocol |
| PRN | MAP Provide Roaming Number |
| RRB | Request Report Basic call state model |
| SCCP | Signaling Connection Control Part |
| SCF | Service Control Function |
| SGSN | Serving GPRS Support Node |
| SMS | Short Message Service |
| SMSC | Short Message Service Center |
| SS7 | Signaling System #7 |
| SSF | Service Switching Function |
| SSN | Sub System Number |
| STP | Signaling Transfer Point |
| STP-H | HPMN STP |
| STP-V | VPMN STP |
| TAP | Transferred Account Procedure |
| T-CSI | Terminating CSI |
| VLR | Visitor Location Register |
| VMSC | Visited MSC |
| VPMN | Visited Public Mobile Network |
| VT-CSI | VMSC Terminating CSI |

Technical References, Each of Which is Incorporated by Reference Herein:

GSM 902 on MAP specification
Digital cellular telecommunications system (Phase 2+) Mobile Application Part (MAP) Specification (3GPP TS 09.02 version 7.9.0 Release 1998)
GSM 340 on SMS
Digital cellular telecommunications system (Phase 2+) Technical realization of the Short Message Service (SMS) (GSM 03.40 version 7.4.0 Release 1998)
GSM 378 on CAMEL Architecture, Release 1998
GSM 978 on CAMEL Application Protocol, Release 1998
GSM 379 on CAMEL Support of Optimal Routing (SOR),
GSM 318 on CAMEL Basic Call Handling,
Q1214-Q1218 on Intelligent Networks,
Q701-704 on SS7 MTP,
Q711-Q714 on SS7 SCCP,
Q760-Q769 on SS7 ISUP
TD.35 NRTRDE Format for Fraud information
FF.18 NRTRDE Business Requirements ETSI CS domain charging documents: TS 12.05, TS 32.005, TS 32.205, TS 32.298;
ETSI PS domain charging documents: TS 12.15, TS 32.015, TS 32.215, TS 32.298;
ETS 300 374-1 Intelligent Network (IN); Intelligent Network Capability Set 1 (CS1); Core Intelligent Network Application Protocol (INAP); Part 1: Protocol specification;
EN 301 140-1 Intelligent Network (IN); Intelligent Network Application Protocol (INAP); Capability Set 2 (CS2); Part 1: Protocol specification;
ITU-T Recommendation Q.1214 (1995), Distributed functional plane for intelligent network CS-1;
ITU-T Recommendation Q.1218 (1995), Interface Recommendation for intelligent network CS-1;
ITU-T Recommendation Q.762 (1999), Signaling system No. 7—ISDN user part general functions of messages and signals;
ITU-T Recommendation Q.763 (1999), Signaling system No. 7—ISDN user part formats and codes;
ITU-T Recommendation Q.764 (1999), Signaling system No. 7—ISDN user part signalling procedures;
ITU-T Recommendation Q.766 (1993), Performance objectives in the integrated services digital network application;
ITU-T Recommendation Q.765 (1998), Signaling system No. 7—Application transport mechanism;
ITU-T Recommendation Q.769.1 (1999), Signaling system No. 7—ISDN user part enhancements for the support of Number Portability; and
Jiang DCG 2006: Dynamic generation of CSI for inbound roamers, United States Patent Application Publication No. 20060252425.
Jiang et al 2003: Method and system for Cellular Network Traffic Redirection, U.S. patent application Ser. No. 10/635,804;

What is claimed is:

1. A method for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the method comprising:

detecting the occurrence of an event parameter relating to the mobile communication via one of: a dynamic Customized Application of Mobile network Enhanced Logic (CAMEL) gateway and a monitoring block connected to the dynamic CAMEL gateway;

upon the detection, generating, in real time at the first gateway, the roaming information based on the event parameter, the roaming information being in a format comprehendible to a Near Real Time Roaming Data Exchange (NRTRDE) agent associated with the VPMN; and transmitting, in real time, the roaming information, via the first gateway to the NRTRDE agent.

2. The method of claim 1, wherein detecting the occurrence of the event parameter further comprises:

monitoring, at the first gateway, Signaling Connection Control Part (SCCP) and ISDN User Part (ISUP) roaming signaling links between the HPMN and the VPMN, and a Gp interface between a VPMN Serving GPRS Support Node (SGSN) and an HPMN Gateway GPRS Support Node (GGSN).

3. The method of claim 1, wherein detecting the occurrence of the event parameter further comprises:

polling, at the first gateway, an Equipment Identity Register (EIR) database associated with the VPMN for the event parameter.

4. The method of claim 1, wherein detecting the occurrence of the event parameter further comprises:

monitoring, at the first gateway, signaling messages exchanged between an EIR database and a VMSC for the event parameter, wherein the EIR database is associated with the VPMN.

5. The method of claim 1, wherein detecting the occurrence of the event parameter further comprises:

accessing, via the first gateway, an EIR database for the event parameter upon receiving an event parameter check message from a Visited Mobile Switching Center (VMSC) associated with the VPMN, wherein the EIR database is associated with the VPMN.

6. The method of claim 1, wherein detecting the occurrence of the event parameter further comprises:

capturing the event parameter from an event parameter check message.

7. The method of claim 1, wherein detecting the occurrence of the event parameter further comprises:

capturing the event parameter from call control signaling of the inbound roamer received at the first gateway.

8. The method of claim 1, the event parameter comprising an International Mobile Equipment Identity (IMEI), wherein detecting the occurrence of the event parameter further comprises:

sending, via the first gateway, one of an event parameter obtain message and an event parameter request message to a VMSC associated with the VPMN;

in response to the event parameter request message, receiving from the VMSC at the first gateway one of:

call information report after completion of the inbound roamer's mobile communication in the VPMN, wherein the call information report comprises the event parameter;

an event parameter result message comprising the event parameter; and in response to the event parameter obtain message, receiving the IMEI from the VMSC at the first gateway.

9. The method of claim 1, the event parameter comprising a call event start time, wherein detecting the occurrence of the event parameter further comprises:

deriving, at the first gateway, the call event start time from one of:

a time instant when the first gateway relays a received CAP message to a Service Control Function (SCF) associated with the HPMN;

a call information report; and an ISDN User Part (ISUP) Initial Address Message (IAM) message.

10. The method of claim 1, the event parameter comprising call event duration, wherein detecting the occurrence of the event parameter further comprises:

calculating, at the first gateway, the call event duration from a time difference between one of:

an answer notification and a disconnect notification; and a create Packet Data Protocol (PDP) context message and a delete PDP context message.

11. The method of claim 1, the event parameter comprising a charge amount, wherein detecting the occurrence of the event parameter further comprises:

calculating, at the first gateway, the charge amount for the inbound roamer's mobile communication in the VPMN based on at least one of: an Inter Operator Tariff (IOT) structure associated with the VPMN, a call destination number, call event duration, data exchanged during General Packet Radio Services (GPRS) session and an Access Point Name (APN).

12. The method of claim 1, the event parameter comprising an International Mobile Subscriber Identity (IMSI), wherein detecting the occurrence of the event parameter further comprises:

determining the IMSI by identifying the IMSI that corresponds to a received Mobile Station International Subscriber Directory Number (MSISDN) of the inbound roamer, wherein the IMSI is stored in a database associated with the first gateway.

13. The method of claim 1 further comprising:

dynamically creating, at the first gateway, a CAMEL Subscription Information (CSI) for the inbound roamer.

14. The method of claim 1 further comprising:

configuring a Service Switching Function (SSF) associated with the VPMN with static IN trigger profile for Mobile Originated (MO) call by the inbound roamer so as to direct the MO call to the first gateway.

15. The method of claim 1 further comprising:

enabling the mobile communication of the inbound roamer in the VPMN by inserting one or more events for the inbound roamer's mobile communication at one of:

a VMSC/Visitor Location Register (VLR) associated with the VPMN, and a SSF associated with the VPMN, wherein the events are inserted when the first gateway detects absence of the events.

16. The method of claim 1, wherein generating the roaming information in real time further comprises at least one of:
   storing the detected event parameter in a database associated with the first gateway;
   selecting the event parameter from the database to generate the roaming information; and
   upon completion of the inbound roamer's mobile communication, aggregating the selected event parameter so as to create one of: a flat file and an NRTRDE file.

17. The method of claim 1, wherein generating the roaming information in real time further comprises:
   creating one of an NRTRDE file and a flat file from the event parameter obtained at the first gateway during the mobile communication of the inbound roamer in the VPMN.

18. The method of claim 1, wherein generating the roaming information in real time further comprises:
   using the detected event parameter to create one of complete roaming information and partial roaming information.

19. The method of claim 18, wherein the partial roaming information is created by the first gateway at a pre-defined time interval during the mobile communication of the inbound roamer and is sent to one of the NRTRDE agent and the second gateway.

20. The method of claim 1, wherein the generated roaming information in real time is in one of TD.35 format and the VPMN's pre-defined format.

21. A method for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the method comprising:
   at the HPMN, detecting an event parameter relating to the mobile communication via one of: a dynamic Customized Application of Mobile network Enhanced Logic (CAMEL) gateway and a monitoring block connected to the dynamic CAMEL gateway; and
   upon the detecting, receiving, in real time, the roaming information via the first gateway at a Near Real Time Roaming Data Exchange (NRTRDE) agent;
   wherein the NRTRDE agent is associated with the VPMN ; and
   wherein the roaming information is generated at the first gateway in real time in a format comprehendible to the NRTRDE agent.

22. A method for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the method comprising:
   facilitating the detection of an event parameter relating to the mobile communication via one of: a dynamic Customized Application of Mobile network Enhanced Logic (CAMEL) gateway and a monitoring block connected to the dynamic CAMEL gateway ; and
   upon the detection, facilitating the receipt, in real time, of the roaming information via the first gateway at a Near Real Time Roaming Data Exchange (NRTRDE) agent;
   wherein the NRTRDE agent is associated with the VPMN;
   wherein the roaming information is generated at the first gateway in real time in a format comprehendible to the NRTRDE agent.

23. A system for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the system comprising:
   a detection module for detecting the occurrence of an event parameter relating to the mobile communication via one of: a dynamic Customized Application of Mobile network Enhanced Logic (CAMEL) gateway and a monitoring block connected to the dynamic CAMEL gateway;
   a generation module for generating, in real time at the first gateway, the roaming information based on the event parameter, the roaming information being in a format comprehendible to a Near Real Time Roaming Data Exchange (NRTRDE) agent associated with the VPMN; and
   a transmission module for transmitting, in real time, the roaming information, via the first gateway to the NRTRDE agent.

24. The system of claim 23, wherein the detection module further comprises:
   a monitoring module for monitoring, at the first gateway, Signaling Connection Control Part (SCCP) and ISDN User Part (ISUP) roaming signaling links between the HPMN and the VPMN, and a Gp interface between a VPMN Serving GPRS Support Node (SGSN) and an HPMN Gateway GPRS Support Node (GGSN).

25. The system of claim 23, wherein the detection module further comprises:
   a polling module for polling, at the first gateway, an Equipment Identity Register (EIR) database associated with the VPMN for the event parameter.

26. The system of claim 23, wherein the detection module further comprises:
   a monitoring module for monitoring, at the first gateway, signaling messages exchanged between an EIR database and a VMSC for the event parameter, wherein the EIR database is associated with the VPMN.

27. The system of claim 23, wherein the detection module further comprises:
   an accessing module for accessing, via the first gateway, an EIR database for the event parameter upon receiving an event parameter check message from a Visited Mobile Switching Center (VMSC) associated with the VPMN, wherein the EIR database is associated with the VPMN.

28. The system of claim 23, wherein the detection module further comprises:
   a capturing module for capturing the event parameter from an event parameter check message.

29. The system of claim 23, wherein the detection module further comprises:
   a capturing module for capturing the event parameter from call control signaling of the inbound roamer received at the first gateway.

30. The system of claim 23, the event parameter comprising an International Mobile Equipment Identity (IMEI), wherein the detection module further comprises:
   a sending module for sending, via the first gateway, one of an event parameter obtain message and an event parameter request message to a VMSC associated with the VPMN;
   a receiving module for receiving, in response to the event parameter request message, from the VMSC at the first gateway one of:

call information report after completion of the inbound roamer's mobile communication in the VPMN, wherein the call information report comprises the event parameter;
an event parameter result message comprising the event parameter; and
in response to the event parameter obtain message, receiving the IMEI from the VMSC at the first gateway.

31. The system of claim 23, the event parameter comprising a call event start time, wherein the detection module further comprises:
a deriving module for deriving, at the first gateway, the call event start time from one of:
a time instant when the first gateway relays a received CAP message to a Service Control Function (SCF) associated with the HPMN;
a call information report; and
an ISDN User Part (ISUP) Initial Address Message (IAM) message.

32. The system of claim 23, the event parameter comprising call event duration, wherein the detection module further comprises:
a calculating module for calculating, at the first gateway, the call event duration from a time difference between one of:
an answer notification and a disconnect notification; and
a create Packet Data Protocol (PDP) context message and a delete PDP context message.

33. The system of claim 23, the event parameter comprising a charge amount, wherein the detection module further comprises:
a calculating module for calculating, at the first gateway, the charge amount for the inbound roamer's mobile communication in the VPMN based on at least one of: an Inter Operator Tariff (IOT) structure associated with the VPMN, a call destination number, call event duration, data exchanged during General Packet Radio Services (GPRS) session and an Access Point Name (APN).

34. The system of claim 23, the event parameter comprising an International Mobile Subscriber Identity (IMSI), wherein the detection module further comprises:
a determining module for determining the IMSI by identifying the IMSI that corresponds to a received Mobile Station International Subscriber Directory Number (MSISDN) of the inbound roamer, wherein the IMSI is stored in a database associated with the first gateway.

35. The system of claim 23 further comprising:
a generation module dynamically creating, at the first gateway, a CAMEL Subscription Information (CSI) for the inbound roamer.

36. The system of claim 23 further comprising:
a configuration module for configuring a Service Switching Function (SSF) associated with the VPMN with static IN trigger profile for Mobile Originated (MO) call by the inbound roamer so as to direct the MO call to the first gateway.

37. The system of claim 23 further comprising:
an enablement module for enabling the mobile communication of the inbound roamer in the VPMN by inserting one or more events for the inbound roamer's mobile communication at one of:
a VMSC/Visitor Location Register (VLR) associated with the VPMN, and
a SSF associated with the VPMN,
wherein the events are inserted when the first gateway detects absence of the events.

38. The system of claim 23, wherein the generation module further comprises at least one of:
a storing module for storing the detected event parameter in a database associated with the first gateway;
a selection module for selecting the event parameter from the database to generate the roaming information; and
an aggregation module for aggregating the selected event parameter, upon completion of the inbound roamer's mobile communication, so as to create one of a flat file and an NRTRDE file.

39. The system of claim 23, wherein the generation module further comprises:
a generation module for creating one of an NRTRDE file and a flat file from the event parameter obtained at the first gateway during the mobile communication of the inbound roamer in the VPMN.

40. The system of claim 23, wherein the generation module further comprises:
a generation module for creating one of complete roaming information and partial roaming information, using the detected event parameter.

41. The system of claim 40, wherein the partial roaming information is created by the first gateway at a pre-defined time interval during the mobile communication of the inbound roamer and is sent to one of the NRTRDE agent and the second gateway.

42. A system for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the system comprising:
a detection module for detecting, at the HPMN, an event parameter relating to the mobile communication via one of: a dynamic Customized Application of Mobile network Enhanced Logic (CAMEL) gateway and a monitoring block connected to the dynamic CAMEL gateway ; and
a receiving module for receiving, upon the detecting in real time, the roaming information via the first gateway at a Near Real Time Roaming Data Exchange (NRTRDE) agent;
wherein the NRTRDE agent is associated with the VPMN ; and
wherein the roaming information is generated at the first gateway in real time in a format comprehendible to the NRTRDE agent.

43. A system for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the system comprising:
a first facilitating module for facilitating the detection of an event parameter relating to the mobile communication via one of: a dynamic Customized Application of Mobile network Enhanced Logic (CAMEL) gateway and a monitoring block connected to the dynamic CAMEL gateway ; and
a second facilitating module for facilitating the receipt, upon the detection in real time, of the roaming information via the first gateway at one of the a Near Real Time Roaming Data Exchange (NRTRDE) agent and the second gateway;

wherein the NRTRDE agent is associated with one of the VPMN and a third party;

wherein the roaming information is generated at the first gateway in real time in a format comprehendible to the NRTRDE agent.

44. A computer readable medium encoded with computer executable instructions for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the computer program product performing the steps of:

detecting the occurrence of an event parameter relating to the mobile communication via of: a dynamic Customized Application of Mobile network Enhanced Logic (CAMEL) gateway and a monitoring block connected to the dynamic CAMEL gateway;

upon the detection, generating, in real time at the first gateway, the roaming information based on the event parameter, the roaming information being in a format comprehendible to a Near Real Time Roaming Data Exchange (NRTRDE) agent associated with the VPMN; and transmitting, in real time, the roaming information, via the first gateway to the NRTRDE agent.

45. A computer readable medium encoded with computer executable instructions for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the computer program product performing the steps of:

at the HPMN, detecting an event parameter relating to the mobile communication via one of: a dynamic Customized Application of Mobile network Enhanced Logic (CAMEL) gateway and a monitoring block connected to the dynamic CAMEL gateway; and upon the detecting, receiving, in real time, the roaming information via the first gateway at a Near Real Time Roaming Data Exchange (NRTRDE) agent;

wherein the NRTRDE agent is associated with the VPMN ; and wherein the roaming information is generated at the first gateway in real time in a format comprehendible to the NRTRDE agent.

46. A computer readable medium encoded with computer executable instructions for exchanging roaming information between a Home Public Mobile Network (HPMN) and a Visited Public Mobile Network (VPMN) in real time, the VPMN having an associated first gateway, the HPMN having an associated second gateway, the roaming information relating to a mobile communication by an inbound roamer of the VPMN, the computer program product performing the steps of:

facilitating the detection of an event parameter relating to the mobile communication of: a dynamic Customized Application of Mobile network Enhanced Logic (CAMEL) gateway and a monitoring block connected to the dynamic CAMEL gateway ; and upon the detection, facilitating the receipt, in real time, of the roaming information via the first gateway at a Near Real Time Roaming Data Exchange (NRTRDE) agent;

wherein the NRTRDE agent is associated with the VPMN;

wherein the roaming information is generated at the first gateway in real time in a format comprehendible to the NRTRDE agent.

* * * * *